US012580617B2

(12) United States Patent
Bhatt et al.

(10) Patent No.: US 12,580,617 B2
(45) Date of Patent: Mar. 17, 2026

(54) SYSTEMS AND METHODS FOR EFFICIENT TIME MULTIPLEXED DIGITAL BEAMFORMING

(71) Applicant: HFCL Limited, Karnataka (IN)

(72) Inventors: Prasad Venkatesh Bhatt, Bangalore (IN); Santanu Bhattacharyya, Bangalore (IN); Saurabh Hota, Bangalore (IN)

(73) Assignee: HFCL Limited, Bangalore (IN)

( * ) Notice: Subject to any disclaimer, the term of this patent is extended or adjusted under 35 U.S.C. 154(b) by 132 days.

(21) Appl. No.: 18/742,643

(22) Filed: Jun. 13, 2024

(65) Prior Publication Data

US 2024/0421872 A1     Dec. 19, 2024

(30) Foreign Application Priority Data

Jun. 16, 2023    (IN) .............................. 202341041013

(51) Int. Cl.
*H04B 7/06*          (2006.01)
(52) U.S. Cl.
CPC ................................. *H04B 7/0617* (2013.01)
(58) Field of Classification Search
CPC ................................. H04B 7/06; H04B 7/0617
See application file for complete search history.

(56) References Cited

U.S. PATENT DOCUMENTS

| | | | |
|---|---|---|---|
| 8,406,812 B2 | 3/2013 | Smith et al. | |
| 11,588,592 B2 | 2/2023 | Zhou et al. | |
| 2022/0021423 A1* | 1/2022 | Ahmed | H04W 72/21 |
| 2023/0217422 A1* | 7/2023 | Sachidanand Sinha | H04B 7/0617 370/280 |
| 2023/0344680 A1* | 10/2023 | Akoum | H04B 7/0619 |
| 2024/0421872 A1* | 12/2024 | Bhatt | H04B 7/0617 |

FOREIGN PATENT DOCUMENTS

| | | |
|---|---|---|
| CN | 108923834 B | 2/2020 |
| WO | 2022017597 A1 | 1/2022 |

\* cited by examiner

*Primary Examiner* — Jaison Joseph
(74) *Attorney, Agent, or Firm* — William P. Jensen; Crain Caton & James, P.C.

(57)          ABSTRACT
Systems and methods for efficient time multiplexed digital beamforming in a network are described. In particular, the system (for example, a radio unit) receives a C-plane packet from a fronthaul interface and stores corresponding control information of the C-plane packet at a scheduler, stores beam weight information in one or more beam weight buffers, receives and stores data samples in data input buffers, receives processing information from a timer, receives one or more scheduling instructions for at least two of the data input buffers from the scheduler, sequentially retrieves the data samples from the at least two of the data input buffers based on the one or more scheduling instructions, and processes the retrieved data samples from the at least two of the data input buffers for beamforming within a single symbol duration based on synchronization of the one or more scheduling instructions.

20 Claims, 13 Drawing Sheets

FIG. 1C

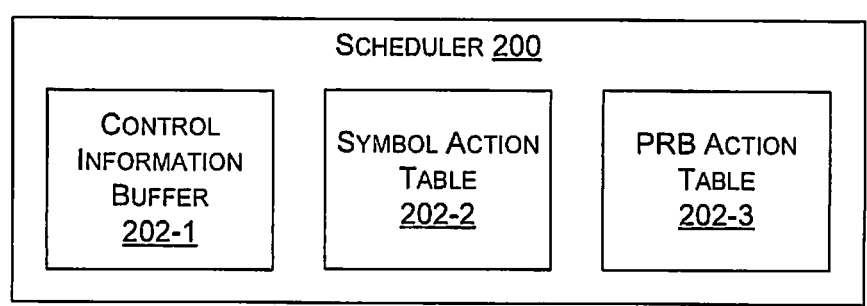
SCHEDULER 200
| CONTROL INFORMATION BUFFER 202-1 | SYMBOL ACTION TABLE 202-2 | PRB ACTION TABLE 202-3 |
FIG. 2
300A
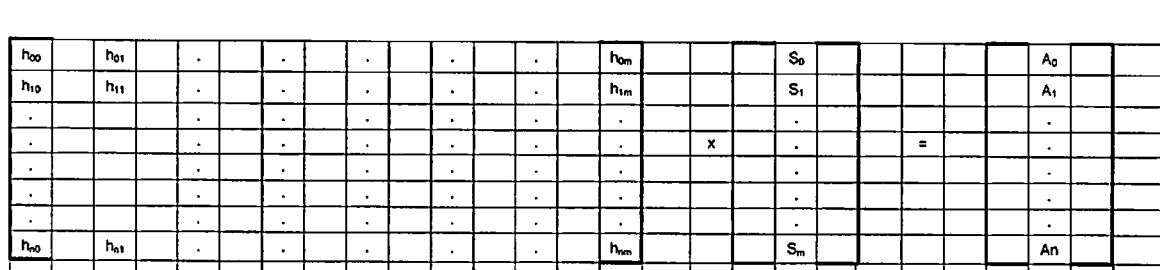
FIG. 3A
300B
FIG. 3B

400

500

800

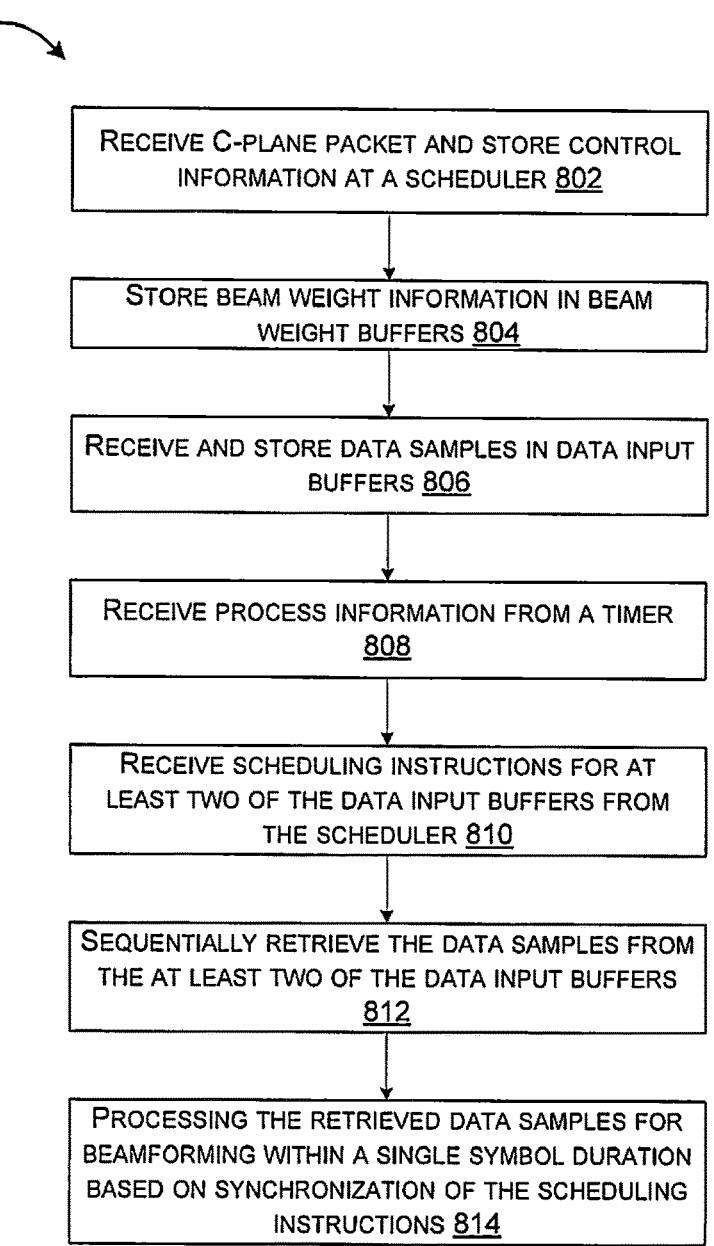

RECEIVE C-PLANE PACKET AND STORE CONTROL
INFORMATION AT A SCHEDULER 802

STORE BEAM WEIGHT INFORMATION IN BEAM
WEIGHT BUFFERS 804

RECEIVE AND STORE DATA SAMPLES IN DATA INPUT
BUFFERS 806

RECEIVE PROCESS INFORMATION FROM A TIMER
808

RECEIVE SCHEDULING INSTRUCTIONS FOR AT
LEAST TWO OF THE DATA INPUT BUFFERS FROM
THE SCHEDULER 810

SEQUENTIALLY RETRIEVE THE DATA SAMPLES FROM
THE AT LEAST TWO OF THE DATA INPUT BUFFERS
812

PROCESSING THE RETRIEVED DATA SAMPLES FOR
BEAMFORMING WITHIN A SINGLE SYMBOL DURATION
BASED ON SYNCHRONIZATION OF THE SCHEDULING
INSTRUCTIONS 814

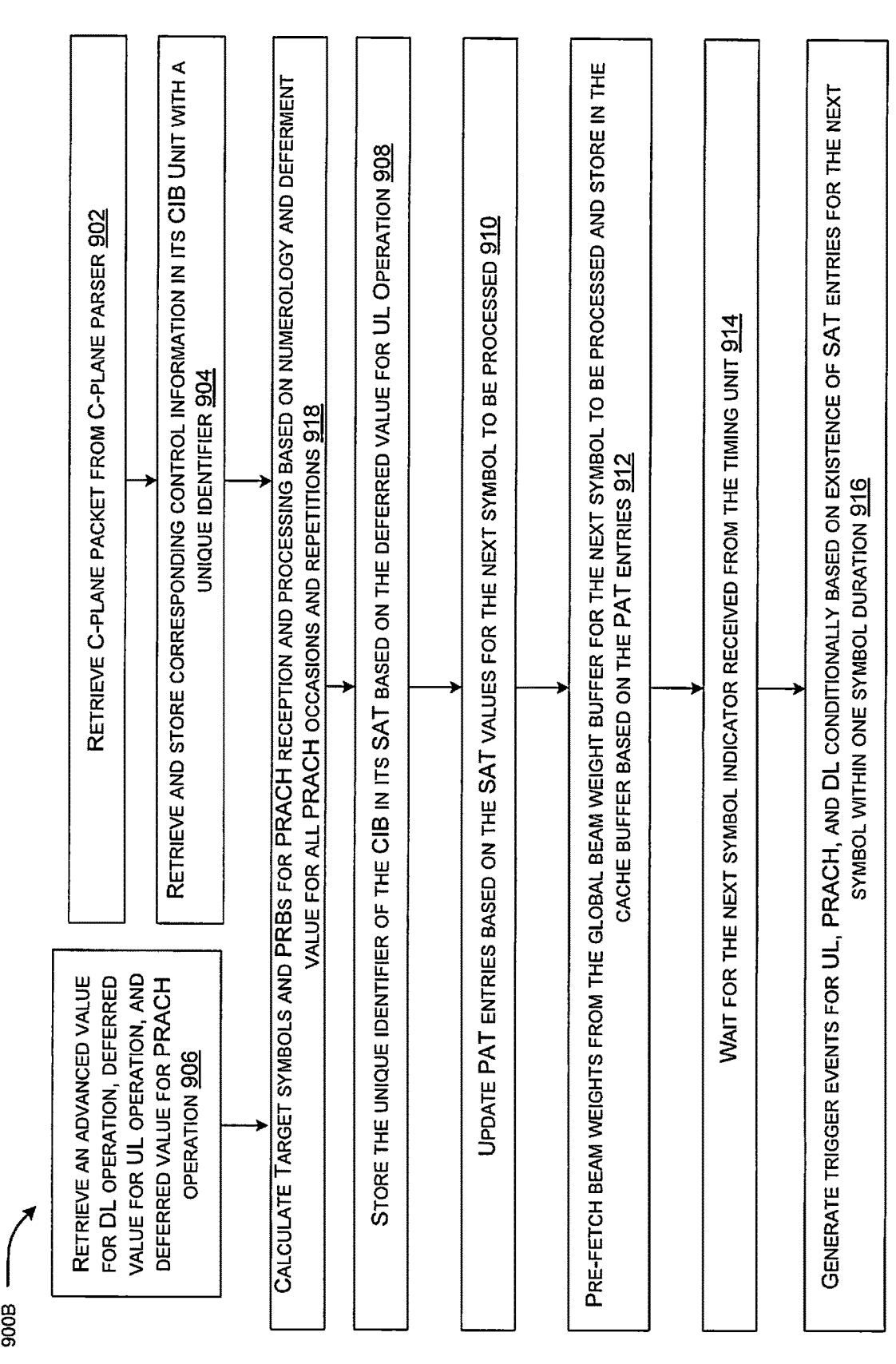

RETRIEVE C-PLANE PACKET FROM C-PLANE PARSER 902

RETRIEVE AND STORE CORRESPONDING CONTROL INFORMATION IN ITS CIB UNIT WITH A UNIQUE IDENTIFIER 904

RETRIEVE AN ADVANCED VALUE FOR DL OPERATION, DEFERRED VALUE FOR UL OPERATION, AND DEFERRED VALUE FOR PRACH OPERATION 906

CALCULATE TARGET SYMBOLS AND PRBs FOR PRACH RECEPTION AND PROCESSING BASED ON NUMEROLOGY AND DEFERMENT VALUE FOR ALL PRACH OCCASIONS AND REPETITIONS 918

STORE THE UNIQUE IDENTIFIER OF THE CIB IN ITS SAT BASED ON THE DEFERRED VALUE FOR UL OPERATION 908

UPDATE PAT ENTRIES BASED ON THE SAT VALUES FOR THE NEXT SYMBOL TO BE PROCESSED 910

PRE-FETCH BEAM WEIGHTS FROM THE GLOBAL BEAM WEIGHT BUFFER FOR THE NEXT SYMBOL TO BE PROCESSED AND STORE IN THE CACHE BUFFER BASED ON THE PAT ENTRIES 912

WAIT FOR THE NEXT SYMBOL INDICATOR RECEIVED FROM THE TIMING UNIT 914

GENERATE TRIGGER EVENTS FOR UL, PRACH, AND DL CONDITIONALLY BASED ON EXISTENCE OF SAT ENTRIES FOR THE NEXT SYMBOL WITHIN ONE SYMBOL DURATION 916

FIG. 9B

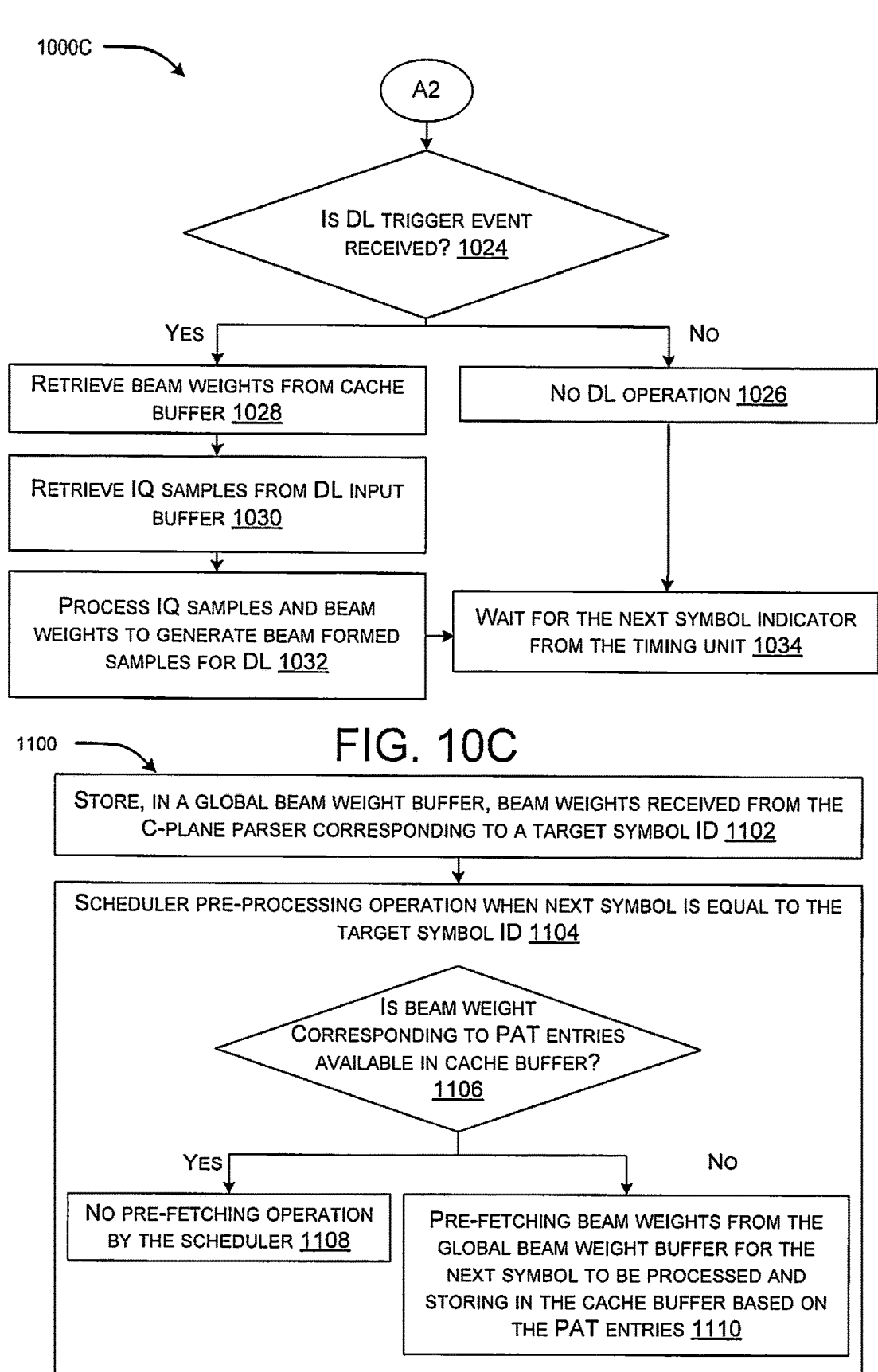

1000C

A2

IS DL TRIGGER EVENT RECEIVED? 1024

YES

RETRIEVE BEAM WEIGHTS FROM CACHE BUFFER 1028

RETRIEVE IQ SAMPLES FROM DL INPUT BUFFER 1030

PROCESS IQ SAMPLES AND BEAM WEIGHTS TO GENERATE BEAM FORMED SAMPLES FOR DL 1032

No

NO DL OPERATION 1026

WAIT FOR THE NEXT SYMBOL INDICATOR FROM THE TIMING UNIT 1034

STORE, IN A GLOBAL BEAM WEIGHT BUFFER, BEAM WEIGHTS RECEIVED FROM THE C-PLANE PARSER CORRESPONDING TO A TARGET SYMBOL ID 1102

SCHEDULER PRE-PROCESSING OPERATION WHEN NEXT SYMBOL IS EQUAL TO THE TARGET SYMBOL ID 1104

IS BEAM WEIGHT CORRESPONDING TO PAT ENTRIES AVAILABLE IN CACHE BUFFER? 1106

YES

NO PRE-FETCHING OPERATION BY THE SCHEDULER 1108

No

PRE-FETCHING BEAM WEIGHTS FROM THE GLOBAL BEAM WEIGHT BUFFER FOR THE NEXT SYMBOL TO BE PROCESSED AND STORING IN THE CACHE BUFFER BASED ON THE PAT ENTRIES 1110

FIG. 11

SYSTEMS AND METHODS FOR EFFICIENT TIME MULTIPLEXED DIGITAL BEAMFORMING

TECHNICAL FIELD

The present disclosure, in general, relates to managing communication in a wireless communication network, and in particular, relates to time multiplexed digital beamforming.

BACKGROUND

Existing solutions for time division duplexing (TDD)-based device have a separate data path for downlink and uplink. Thus, a separate beamformer core for downlink and uplink is required. This increases the compute resource utilization of the underlying semiconductor technology and increases the power requirements as well. These resources account for a significant area in the semiconductor chip due to more antenna ports and more carrier frequencies.

Further, control channels for both downlink and uplink operations have different characteristics. Thus, traditionally, different beamformer units are utilized for processing the operations separately. However, this enhances the hardware requirement of the overall device and increases the power consumption. Further, if a single beamformer unit is used and if there is lack of synchronization between the operations, there may be a chance of overlap of beamforming operations (uplink and downlink), which may lead to degradation of the overall performance of the device.

Additionally, having physical uplink shared channel (PUSCH) in non-mixed numerology (e.g., 30 KHz) and supporting physical random access channel (PRACH) with multiple sub-carrier spacing (e.g., 1.25, 5, 15, 30 KHz) for long and short formats, require different beam weights for different numerologies. Thus, traditionally, separate beamformer units other than the PUSCH beamformer unit, is required to perform PRACH beamforming. This may require additional resources, which may increase the hardware requirement of the overall device and increase the power consumption.

There is, therefore, a need in the art to provide systems and methods that can overcome the shortcomings of the current mechanisms.

OBJECTS OF THE PRESENT DISCLOSURE

It is an object of the present disclosure to provide a solution for efficient time multiplexed digital beamforming in a network architecture.

It is an object of the present disclosure to use a single beamformer in a radio unit for processing uplink, downlink, and physical random access channel (PRACH) data samples independently as well as simultaneously within a single symbol duration.

It is an object of the present disclosure to reduce resource utilization without impacting the performance of the entire radio unit.

It is an object of the present disclosure to reduce power consumption by way of the proposed mechanism.

It is an object of the present disclosure to use a single beamformer for supporting static and dynamic PRACH.

SUMMARY

In an aspect, the present disclosure relates to a radio unit for efficient beamforming. The radio unit includes a control-plane (C-plane) parser to receive a C-plane packet from a fronthaul interface, wherein the C-plane packet includes control information corresponding to beam weight information and timing information, one or more beam weight buffers to store the beam weight information, data input buffers to receive and store data samples, wherein the data samples include at least one of an uplink data sample, a downlink data sample, and a physical random access channel (PRACH) data sample, a timer to generate and provide processing information to a scheduler, the scheduler to generate one or more scheduling instructions for at least two of the data input buffers, wherein the one or more scheduling instructions are based on the processing information and the timing information, and a beamformer to sequentially retrieve the data samples from the at least two of the data input buffers based on the one or more scheduling instructions, and process the retrieved data samples from the at least two of the data input buffers for beamforming within a single symbol duration based on synchronization of the one or more scheduling instructions.

In an example embodiment, the beamformer may process the retrieved data samples by being configured to calculate a delay value for each of the one or more scheduling instructions in processing each of the retrieved data samples, wherein the delay value may include at least one of an advanced value for a downlink operation command corresponding to the downlink data sample, a deferred value for an uplink operation command corresponding to the uplink data sample, and a deferred value for a PRACH operation command for the PRACH data sample, and store, by the processor, the delay value for each of the one or more scheduling instructions at the scheduler.

In an example embodiment, the delay value may be based on a hardware configuration of respective downlink digital front end (DFE) radio frequency (RF) chain, uplink DFE RF chain, and a PRACH DFE RF chain.

In an example embodiment, the beamformer may process the retrieved data samples by performing the beamforming for the retrieved data samples independently. In another example embodiment, the beamformer may process the retrieved data samples by performing the beamforming for the retrieved data samples simultaneously.

In an example embodiment, the beamformer may process the retrieved data samples by determining whether the one or more scheduling instructions include an uplink operation command, a downlink operation command, or a PRACH operation command, retrieving the beam weight information from the one or more beam weight buffers based on the determination, processing the retrieved data samples from the at least two of the data input buffers and the beam weight information to generate beamformed data samples based on the one or more scheduling instructions within the single symbol duration, and storing the beamformed data samples in corresponding data output buffers of the radio unit.

In an example embodiment, the data input buffers may include an uplink data input buffer, a downlink data input buffer, and a PRACH data input buffer corresponding to each of the uplink data sample, the downlink data sample, and the PRACH data sample, and wherein the data output buffers may include an uplink data output buffer, a downlink data output buffer, and a PRACH data output buffer corresponding to each of a beamformed uplink data sample, a beamformed downlink data sample, and a beamformed PRACH data sample.

In an example embodiment, the beamformer may sequentially retrieve the data samples from the at least two of the data input buffers by retrieving the uplink data sample from the uplink data input buffer based on determining the uplink operation command, retrieving the PRACH data sample from the PRACH data input buffer based on determining the PRACH operation command, and retrieving the downlink data sample from the downlink data input buffer based on determining the downlink operation command.

In an example embodiment, the beamformer may process the retrieved data samples by processing the uplink data sample after a deferred value associated with the uplink operation command once the uplink data sample is received at an antenna, processing the PRACH data sample after a deferred value associated with the PRACH operation command once the PRACH data sample is received at the antenna, and processing the downlink data sample at an advanced value associated with the downlink operation command than the time at which the downlink data sample is to radiate through the antenna.

In an example embodiment, the scheduler may store the corresponding control information, associate the control information with a unique identifier in a control information buffer, store the unique identifier in a symbol action table based on the delay value for each of the one or more scheduling instructions, update a physical resource block (PRB) action table based on the symbol action table for a next symbol to be processed, and trigger the one or more scheduling instructions for the data samples based on the symbol action table and the processing information for the next symbol within the single symbol duration.

In an example embodiment, each entry in the PRB action table may include information corresponding to masking of a resource element to enable beamforming of two channels independently within the resource element, and wherein the two channels comprise one of: a data channel and a control channel, or two independent data channels.

In an example embodiment, the beamformer may store the beam weight information received in the control information in a global beam weight buffer of the one or more beam weight buffers corresponding to a target symbol identifier (ID), wherein the scheduler may determine whether the beam weight information corresponding to the PRB action table is available in a cache buffer of the one or more beam weight buffers based on the next symbol being equal to the target symbol ID, in response to a negative determination, pre-fetch the beam weight information for the next symbol from the global beam weight buffer and store the pre-fetched beam weight information in the cache buffer based on the PRB action table, and in response to a positive determination, trigger the one or more scheduling instructions.

In an example embodiment, cache buffer may include a plurality of sub-modules corresponding to a number of parallel streams of the beamformer, wherein the scheduler may pre-fetch the beam weight information based on a round robin arbitration mechanism with dynamic arbitration slot allocation.

In an example embodiment, the processing information from the timer may include at least one of a current frame, a subframe, and a symbol identifier (ID) being processed by an antenna on air.

In an example embodiment, the beamformer may include a plurality of slices, each slice including complex multipliers and complex adders, wherein each slice may generate an output for an antenna in case of a downlink operation command, and wherein each slice may be followed by a subsequent complex adder to generate output for one stream in case of an uplink operation command.

In another aspect, the present disclosure relates to a method for efficient beamforming, including receiving, by a processor associated with a radio unit, a control-plane (C-plane) packet from a fronthaul interface and storing corresponding control information of the C-plane packet at a scheduler of the radio unit, storing, by the processor, beam weight information received in the control information in one or more beam weight buffers of the radio unit, receiving and storing, by the processor, data samples in data input buffers of the radio unit, wherein the data samples include at least one of an uplink data sample, a downlink data sample, and a physical random access channel (PRACH) data sample, receiving, by the processor, processing information from a timer of the radio unit, receiving, by the processor, one or more scheduling instructions for at least two of the data input buffers from the scheduler, wherein the one or more scheduling instructions are based on the processing information and timing information received in the control information, sequentially retrieving, by the processor, the data samples from the at least two of the data input buffers based on the one or more scheduling instructions, and processing, by the processor, the retrieved data samples from the at least two of the data input buffers for beamforming within a single symbol duration based on synchronization of the one or more scheduling instructions.

In another aspect, the present disclosure relates to a method for efficient beamforming, including receiving, by a processor associated with a radio unit, a control-plane (C-plane) packet from a fronthaul interface, extracting and storing, by the processor, control information from the C-plane packet in a control information buffer of a scheduler with a unique identifier, retrieving, by the processor, a delay value associated with one or more scheduling instructions, storing, by the processor, the unique identifier of the control information buffer in a symbol action table for target symbols based on the delay value, updating, by the processor, physical resource block (PRB) action table entries based on the symbol action table for a next symbol to be processed, pre-fetching, by the processor, beam weight information from a global beam weight buffer for the next symbol and storing the pre-fetched beam weight information in a cache buffer based on the PRB action table entries, receiving, by the processor, processing information from a timer of the radio unit, triggering, by the processor, the one or more scheduling instructions for data samples from at least two data input buffers based on the symbol action table and the processing information for the next symbol within a single symbol duration, wherein the data samples include at least one of an uplink data sample, a downlink sample, and a physical random access channel (PRACH) data sample.

In an example embodiment, the method may include calculating, by the processor, one or more parameters for the PRACH data sample based at least on numerology, the delay value, and the control information, wherein the one or more parameters include at least one of target symbols, start symbols, start of PRB, and number of PRBs for PRACH reception and processing.

In an example embodiment, the control information may include at least one of the beam weight information and timing information, and wherein the timing information comprises a time offset value and a frequency offset value.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

FIG. 1C illustrates an example architecture of radio access network, in accordance with an embodiment of the present disclosure.

FIG. 2 illustrates an example block diagram of a scheduler in a radio unit, in accordance with an embodiment of the present disclosure.

FIGS. 3A and 3B illustrate exemplary representations of downlink stream to antenna mapping and uplink antenna to stream mapping, respectively, in accordance with embodiments of the present disclosure.

FIG. 8 illustrates a flow chart of an example method for implementing time division multiplexing beamforming by a single beamformer, in accordance with an embodiment of the present disclosure.

FIGS. 9A and 9B illustrate flow charts of example methods for implementing triggering of one or more scheduling instructions by a scheduler of a radio unit, in accordance with embodiments of the present disclosure.

FIGS. 10A-10C illustrate flow charts of example methods for implementing synchronization of scheduling instructions, in accordance with embodiments of the present disclosure.

FIG. 11 illustrates a flow chart of an example method for implementing optimal beam weight retrieval, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

The present disclosure uses one digital beamformer unit for processing downlink, uplink and physical random access channel (PRACH) data in a time multiplexed manner. In 5G new radio (NR) numerology-1 (SCS subcarrier spacing 30 KHz), an orthogonal frequency division multiplexed (OFDM) symbol duration is around 35.6 us. This duration is available for the beamformer to perform the matrix multiplication of the beam weights with the samples. By over-clocking the beamforming core at a higher frequency than the OFDM symbol frequency, the beamformer may complete downlink, uplink and PRACH operations during one OFDM symbol period duration. This may further be extended to processing of multiple carrier frequencies by the beamformer within one OFDM symbol duration. Also, a similar approach to the beamforming architecture may be used in 5G NR massive multiple input multiple output (MIMO) multi-user beamforming deployments which may use spatial multiplexing to significantly improve spectral efficiency and throughput.

Further, the present disclosure provides a mechanism for energy efficient beam weight retrieval and re-use for beamforming. This leads to optimal use of beam weights within the radio unit, thereby reducing bandwidth overhead on the fronthaul interface. Furthermore, the present disclosure may be used for multiple numerology for PRACH while having a fixed numerology for physical uplink shared channel (PUSCH) beamforming operations.

The various embodiments throughout the disclosure will be explained in more detail with reference to FIGS. 1-12.

Figure 1A:
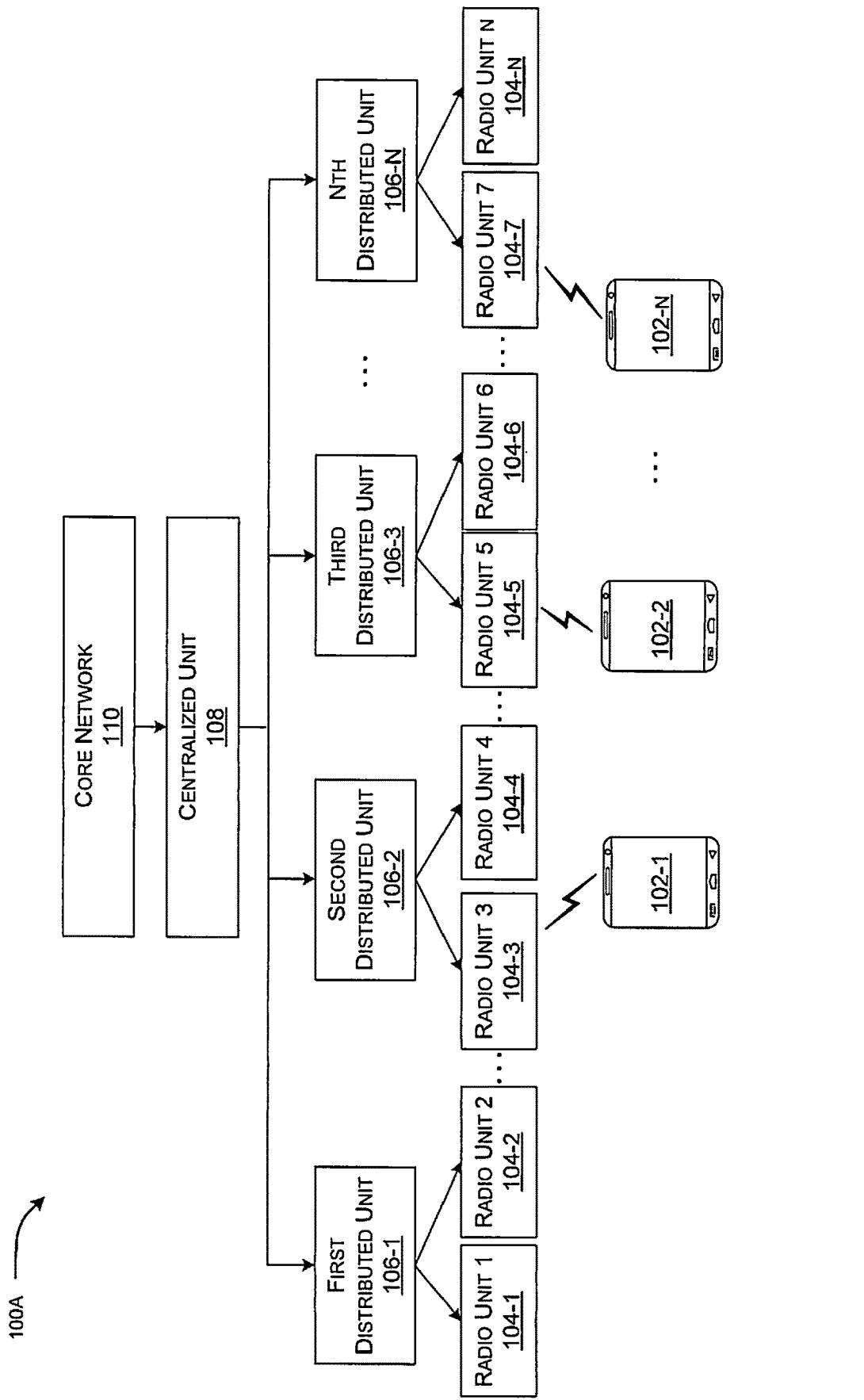
FIG. 1A illustrates an exemplary network architecture in which or with which the proposed mechanism may be implemented, in accordance with an embodiment of the present disclosure.

FIG. 1A illustrates an exemplary network architecture 100A for implementing the proposed mechanism, in accordance with an embodiment of the present disclosure.

In particular, the exemplary network architecture 100A may represent a communication system such as a 5G or next-generation communications system. In an embodiment, the network architecture 100A may include one or more computing devices (102-1, 102-2 . . . 102-N), one or more radio units (104-1, 104-2 . . . 104-N), one or more distributed units (106-1, 106-2 . . . 106-N), a centralized unit 108, and a core network 110. The centralized unit 108 may communicate with the one or more distributed units (106-1, 106-2 . . . 106-N) in a wired or a wireless manner. Further, a first distributed unit 106-1 may communicate with a first radio unit 104-1 and a second radio unit 104-2. Similarly, a second distributed unit 106-2 may communicate with a third radio unit 104-3 and a fourth radio unit 104-4. Furthermore, the one or more computing devices (102-1, 102-2 . . . 102-N) may be communicatively connected to the one or more radio units (104-1, 104-2 . . . 104-N). For example, a first computing device 102-1 may be connected to the third radio unit 104-3. It may be appreciated that there can be any number of distributed units (106-1, 106-2 . . . 106-N) connected to the centralized unit 108. Further, there can be any number of radio units (104-1, 104-2 . . . 104-N) connected to each of the one or more distributed units (106-1, 106-2 . . . 106N). Similarly, there can be any number of computing devices (102-1, 102-2 . . . 102-N) connected to the one or more radio units (104-1, 104-2 . . . 104-N). A person of ordinary skill in the art may understand the one or more distributed units (106-1, 106-2 . . . 106-N) may be collectively referred as the distributed units 106 and individually referred as the distributed unit 106. Further, the one or more radio units (104-1, 104-2 . . . 104-N) may be collectively referred as the radio units 104 and individually referred as the radio unit 104. Similarly, the one or more computing devices (102-1, 102-2 . . . 102-N) may be collectively referred as the computing devices 102 and individually referred as the computing device 102.

In an embodiment, the computing devices 102 may move between different radio units 104, for example, from a first radio unit 104-1 to a second radio unit 104-2, both served by a first distributed unit 106-1. In an embodiment, the computing devices 102 may move between different distributed units 106, for example, from the first distributed unit 106-1 to the second distributed unit 106-2 and vice versa.

Referring to FIG. 1A, the centralized unit 108 and/or the distributed units 106 may be coupled to the core network 110 of an associated wireless network operator. In an embodiment, the centralized unit 108 may be responsible for centralized radio resource and connection management control. In another embodiment, the distributed units 106 may include a processing function for implementing a distributed user plane and process a physical layer function and a layer-2 function.

In an embodiment, the computing devices 102 may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the computing devices 102 may communicate with the distributed units 106 via set of executable instructions residing on any operating system. In an embodiment, the computing devices 102 may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device 102 may include one or more in-built or externally coupled accessories including, but not limited to, a visual aid device such as camera, audio aid, a microphone, a keyboard, input devices for receiving input from a user such as touch pad, touch enabled screen, electronic pen and the like.

It may be appreciated that the computing devices 102 may not be restricted to the mentioned devices and various other devices may be used.

Although FIG. 1A shows exemplary components of the network architecture 100A, in other embodiments, the network architecture 100A may include fewer components, different components, differently arranged components, or additional functional components than depicted in FIG. 1A. Additionally, or alternatively, one or more components of the network architecture 100A may perform functions described as being performed by one or more other components of the network architecture 100A.

Figure 1B:
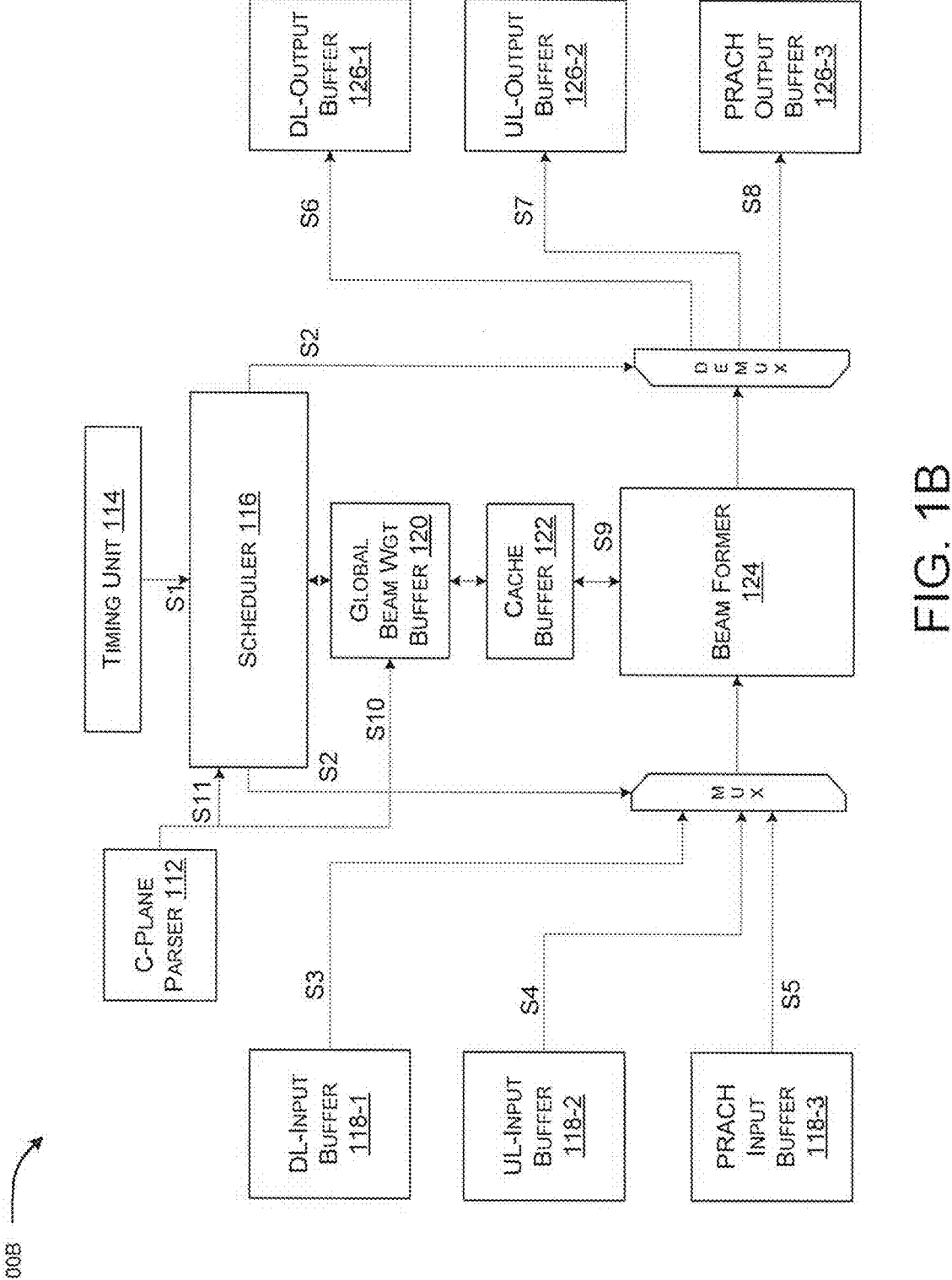
FIG. 1B illustrates an example high-level system architecture of a radio access network (RAN), in accordance with an embodiment of the present disclosure.

FIG. 1B illustrates an exemplary high-level system architecture 100B of a radio unit, in accordance with an embodiment of the present disclosure. It may be appreciated that the radio unit 100B may be similar to the radio unit 104 of FIG. 1A in its functionality.

In particular, the radio unit 100B may include a control-plane (C-plane) parser 112, a timing unit 114, a scheduler 116, data inputs buffers (118-1, 118-2, 118-3), a global beam weight buffer 120, a cache buffer 122, a beamformer 124, and data output buffers (126-1, 126-2, 126-3). It may be appreciated that each of data output buffers (126-1, 126-2, 126-3) may correspond to the respective data input buffers (118-1, 118-2, 118-3). For example, the data input buffers (118-1, 118-2, 118-3) may include a first data input buffer corresponding to a downlink data input buffer 118-1, a second data input buffer corresponding to an uplink data input buffer 118-2, and a third data input buffer corresponding to a physical random access channel (PRACH) data input buffer 118-2. Similarly, the data output buffers (126-1, 126-2, 126-3) may include a first data output buffer corresponding to a downlink data output buffer 126-1, a second data output buffer corresponding to an uplink data output buffer 126-2, and a third data output buffer corresponding to a PRACH data output buffer 126-3.

Figure 1C:
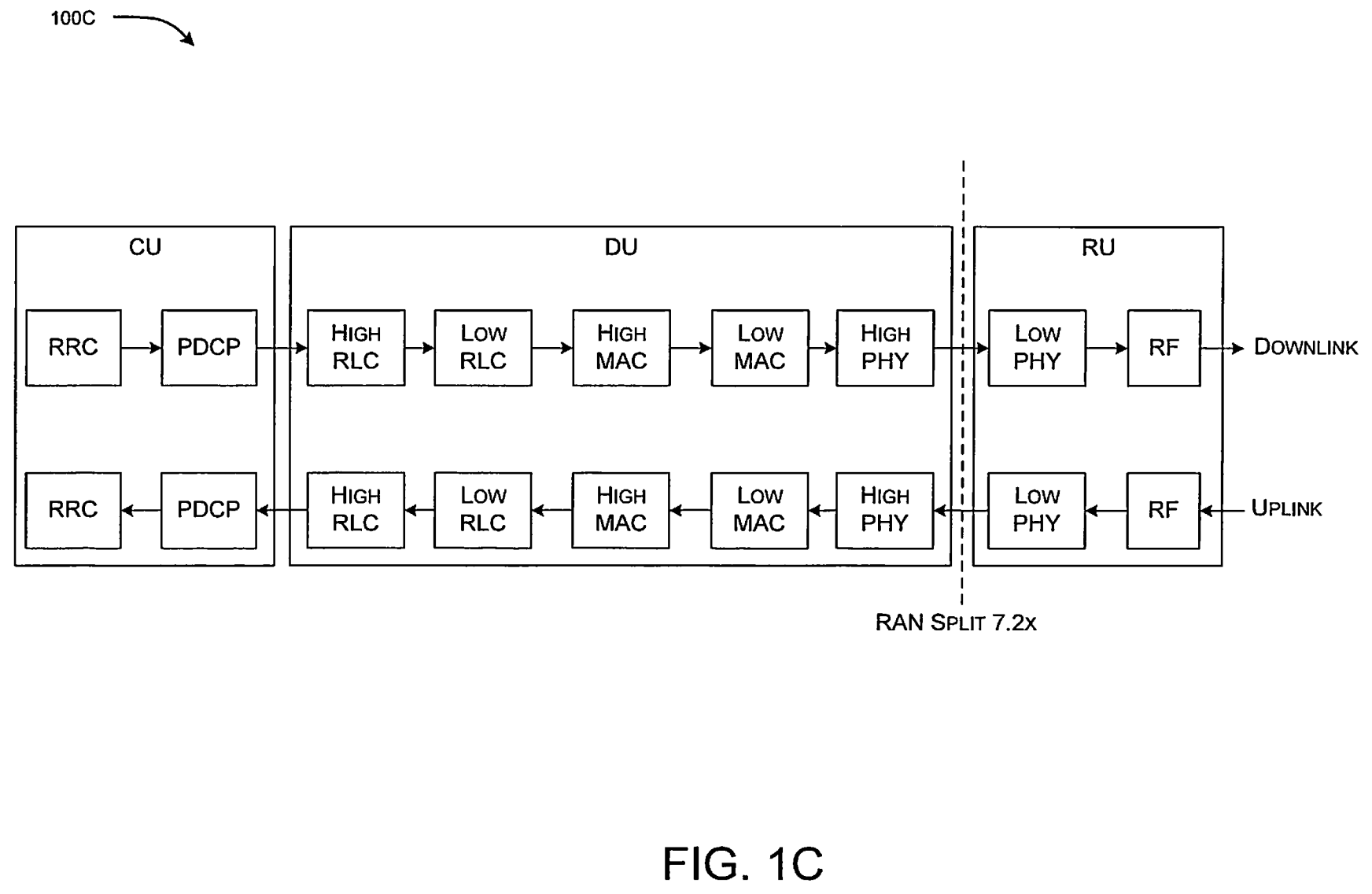

It may be noted that the radio unit 100B depicted in FIG. 1B is based on radio access network (RAN) split 7.2x, as shown in FIG. 1C. In an example embodiment, control information may be received in the form of C-plane packets, and user data In-phase and Quadrature-phase (IQ) samples may be received in the form of user-plane (U-plane) packets from a preceding fronthaul interface, as mentioned in ORAN.WG4.CUS.0-v6.00 specification. Referring to FIG. 1B, the C-plane packets may be decoded by the C-plane parser 112, and provide information corresponding to, but not limited to, beam weights and timing related information such as intended slot and symbol identifier (ID) for the corresponding IQ data of an orthogonal frequency division multiplexing (OFDM) symbol to be transmitted or received on air at an antenna. In an example embodiment, the timing related information may be stored at the scheduler 116 via interface S11.

As depicted in FIG. 1B, there may be two memory structures to store the beam weights, i.e., the global beam weight buffer 120 and the cache buffer 122. In an example embodiment, the global beam weight buffer 120 may store up to 4096 beam weights and reading from the global beam weight buffer 120 may have a higher latency trade-off, and the cache buffer 122 may have a lower latency and may store beam weights less than the global beam weight buffer 120. Referring to FIG. 1B, the C-plane parser 112 may store the beam weights received in the C-plane packets into the global beam weight buffer 120 via interface S10. In an example embodiment, the U-plane packets may be stored in the downlink data input buffer 118-1. Similar, the uplink on air OFDM symbol may be received at the antenna and corresponding IQ samples may be stored in the uplink data input buffer 118-2 and the PRACH data input buffer 118-3.

In an example embodiment, the timing unit 114 may provide processing information such as, but not limited to, a current frame, subframe, slot, and symbol ID being processed by the antenna on air to the scheduler 116 via interface S1. This information along with the timing related information received from the C-plane parser 112 may be used by the scheduler 116 to generate one or more scheduling instructions for each block at the correct symbol period. In an example embodiment, the beam weights may be passed to the beamformer 124 via interface S9 based on the one or more scheduling instructions. Additionally, the data from the data input buffers (118-1, 118-2, 118-3) may be sequentially passed to the beamformer 124 based on the one or more scheduling instructions via interfaces S4, S5, and S3, respectively via a multiplexer. For example, uplink data may be passed to the beamformer 124 from the uplink data input buffer 118-2 via the interface S5, followed by PRACH data from the PRACH data input buffer 118-2 via the interface S5, and downlink data from the downlink data input buffer 118-1 via the interface S3. In particular, the one or more scheduling instructions may include an uplink operation command, a downlink operation command, or a PRAC operation command. Accordingly, based on the respective operation command received from the scheduler 116, the beamformer 124 may retrieve corresponding data from the data input buffers (118-1, 118-2, 118-3) via the multiplexer.

In an example embodiment, the beamformer 124 may process the data or data samples for beamforming within a single symbol duration based on synchronization of the one or more scheduling instructions. The beamformer 124 may perform beamforming of the retrieved data samples independently. In another example embodiment, the beamformer 124 may perform beamforming of the retrieved data samples simultaneously within the single symbol duration. In an example embodiment, the beamformer 124 may perform matrix multiplication of the beam weights received from the cache buffer 122 and the data on a resource element level. In an example embodiment, beamformed data samples may be stored in corresponding data output buffers (126-1, 126-2, 126-3) via a demultiplexer. For example, beamformed downlink data may be stored at the downlink data output buffer 126-1 via the interface S6, beamformed uplink data may be stored at the uplink data output buffer 118-2 via the interface S7, and beamformed PRACH data may be stored at the PRACH data output buffer 118-3 via the interface S8.

In an example embodiment, the beamformer 124 may support various types of beamforming techniques including, but not limited to, predefined beamforming, weight-based dynamic beamforming, and attribute-based dynamic beamforming. In an example embodiment, the predefined beamforming may be supported by providing access of the global beam weight buffer 120 and the cache buffer 122 to a processor. Therefore, any static beam weights received by the radio unit 100B may be written into all locations of the global beam weight buffer 120, and apply same weights for all bandwidth parts. In another example embodiment, in the weight-based dynamic beamforming, beam weights may be received by the radio unit 100B from a distributed unit (e.g., 106) through a C-plane message. In another example embodiment, in the attribute-based dynamic beamforming, once the beam weights may be derived using a specific technique, a corresponding dummy C-plane message may be generated internally and passed on to a scheduler (e.g., 116). The dummy C-plane message may include timing related information along with the derived beam weights.

In an example embodiment, the radio unit 100B depicted in FIG. 1B is based on radio access network (RAN) split 7.2x, as shown by 100C in FIG. 1C.

FIG. 2 illustrates an example block diagram of a scheduler 200 in a radio unit, in accordance with embodiments of the present disclosure.

As discussed above with reference to FIG. 1B, the operations of a scheduler 200 may be controlled by C-plane packets received by the radio unit (e.g., 100B). It may be appreciated that the scheduler 200 may be similar to the scheduler 116 of FIG. 1B in its functionality. The C-plane packets may be decoded by a C-plane parser (e.g., 112), which may identify various fields in the packets and generate pointers to different memory locations dedicated for downlink, uplink, and PRACH, and beam weight arriving with the C-plane packets may be stored in a global beam weight buffer 120.

Referring to FIG. 2, the scheduler 200 may have three buffers, control information buffer 202-1, symbol action table 202-2, and physical resource block (PRB) action table 202-3. Based on the pointer generated by the C-plane parser 112, control information may be stored in a specific location in the control information buffer 202-1. There may be two possible locations for each control message to support two resource element masks (ReMasks) for the same bandwidth part. In an example embodiment, the symbol action table 202-2 may store the symbol ID on which a corresponding U-plane packet data is to be operated by a beamformer (e.g., 124). Further, each entry in the PRB action table 202-3 may store information of beam IDs to be used at PRB resource element level. Each entry in the PRB action table 202-3 may also contain information of the ReMask to be used for corresponding resource element. For example, each entry in the PRB action table 202-3 may contain information corresponding to masking of a resource element to enable beamforming of two channels independently within the resource element, such that the two channels may include a data channel and a control channel, or two independent data channels.

FIGS. 3A and 3B illustrate exemplary representations (300A, 300B) of downlink stream to antenna mapping and uplink antenna to stream mapping, respectively, in accordance with embodiments of the present disclosure.

In an example embodiment, a beamformer (e.g., 124) may perform a complex multiplication of M stream data received from downlink fronthaul interface with beam weights, and may generate an output for N antenna ports, as illustrated in FIG. 3A. Similarly, in uplink direction, the beamformer 124 may perform complex multiplication of beamformed-IQ data received from N antenna ports with beam weights, and generate an output for each of the M streams to be sent through an uplink fronthaul interface, as illustrated in FIG. 3B. It may be noted that M and N may be in powers of 2.

Figure 4:
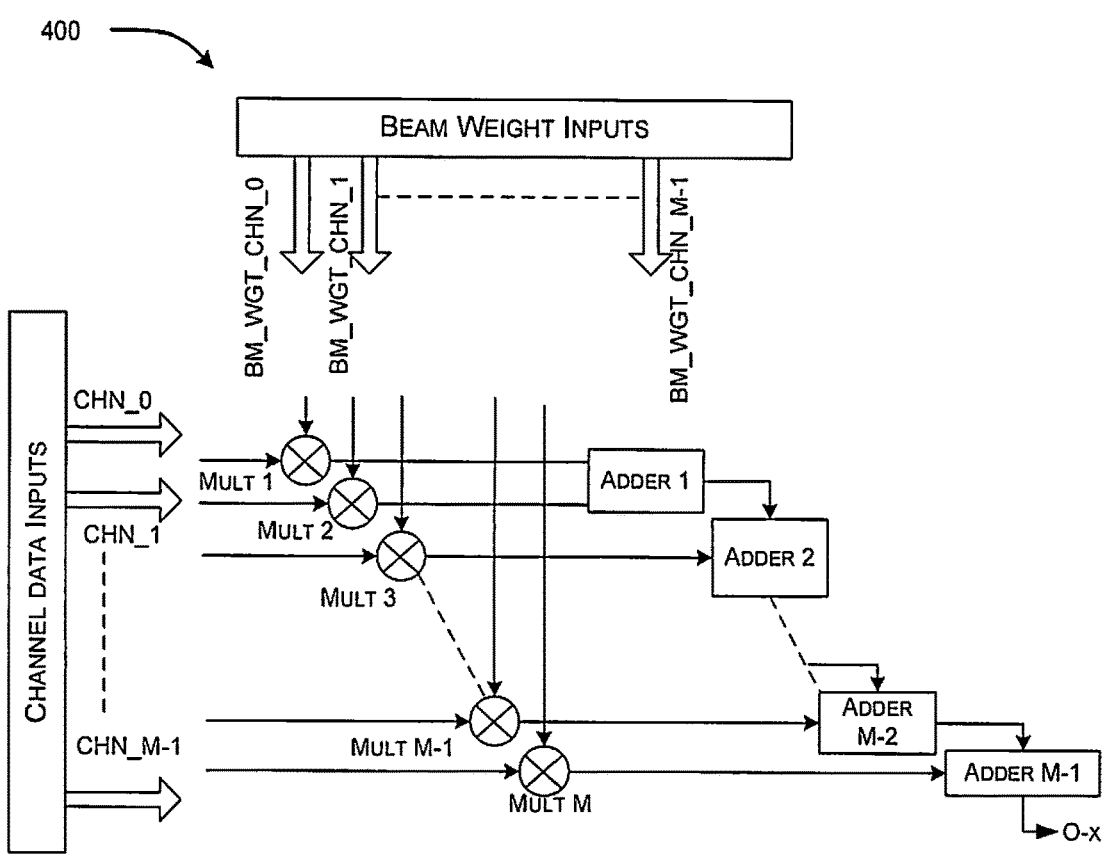
FIG. 4 illustrates an example representation for implementing a beamformer in a radio unit, in accordance with an embodiment of the present disclosure.

FIG. 4 illustrates an example representation 400 for implementing a beamformer in a radio unit, in accordance with embodiments of the present disclosure.

Referring to FIG. 4, a beamformer (e.g., 124) may include N slices, each containing M complex multipliers and M−1 complex adders. It may be noted that FIG. 4 depicts processing of only one slice, and similar blocks may be running in parallel for remaining N−1 slices. In an example embodiment, the width of the multipliers and the adders may be determined by the width of the IQ data samples. In case of a downlink operation, each slice may generate an output for one antenna port. In case of an uplink operation, each slice may be followed by subsequent adder stages, which may add output from N/M slices to generate a final output for one stream. It may be noted that in case the required dimensions are not in powers of 2, (i.e., M and N are not in powers of 2), the representation 400 may be used by 0-padding additional entries to make the dimensions of the matrix in powers of 2. Referring to FIG. 4, the output of adder M–1 is O–x, where x may be from 0 to N–1, and N may be the number of antennas.

As per common ORAN specifications, 8 streams in case of a category A (CAT-A) radio unit implementation, or 4 layers in case of CAT-B radio unit implementation may be mapped to 8 antennas. This may be achieved using the beamformer configuration, as depicted in FIG. 4 using 8×8 and 8×4 matrix configurations, respectively. Similarly, the beamformer configuration may be extended for implementing 16×4, 32×4, 64×4 multiple-input multiple-output (MIMO) beamforming matrix structures. In some embodiments, beam weight information may be received by the beamformer 124 from a multiplexer, as also depicted in FIG. 1B. The output of each slice for downlink may go to a demultiplexer, and the output of each slice for uplink may go to cascading adder stages, which may finally go to the demultiplexer. Although FIG. 4 depicts a beamformer architecture for common ORAN configurations, however, it may be applicable for other ORAN configurations.

Figure 5:
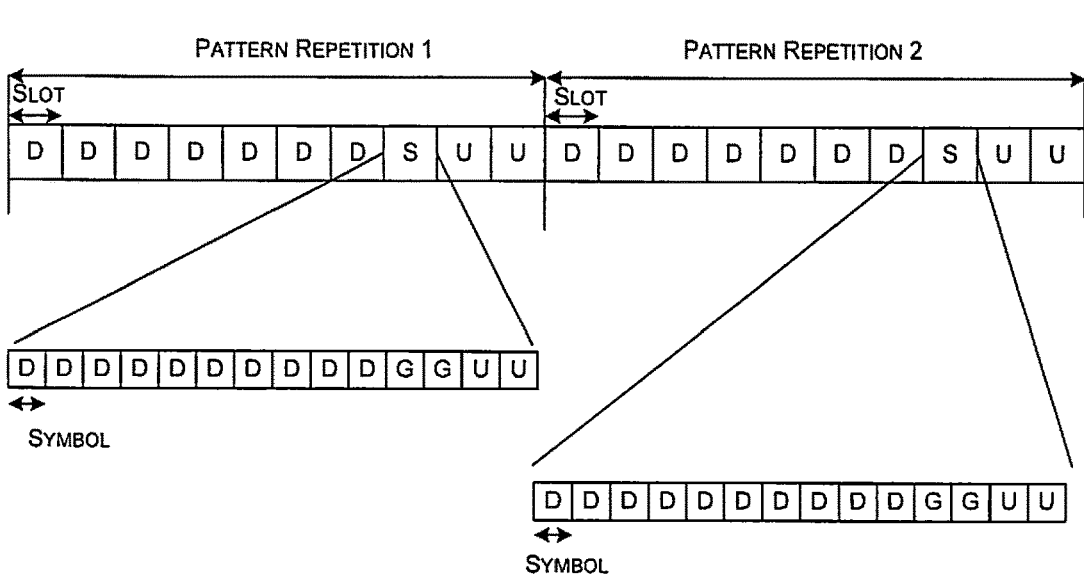
FIG. 5 illustrates an example representation a time division duplexing (TDD) slot pattern, in accordance with an embodiment of the present disclosure.

FIG. 5 illustrates an example representation 500 of a time division duplexing (TDD) slot pattern, in accordance with embodiments of the present disclosure.

In an example embodiment, each symbol within a slot may be configured as uplink (U), downlink (D), or flexible symbol(S). A symbol marked as flexible means that it may be used either for uplink or downlink operation or as a guard period as per requirement. The TDD slot format containing this information, for downlink and uplink operations, may be communicated by a distributed unit (e.g., 106) to a radio unit (e.g., 104 or 100B) over a management-plane (M-plane) message. For example, if a 7D1S2U configuration is communicated with 10 downlink, 2 guard, and 2 uplink symbols in the S slot, it means that over a predefined periodicity, the pattern may repeat, as shown in FIG. 5. The pattern shown in FIG. 5 indicates the transmission/reception time at the air interface.

Figure 6:
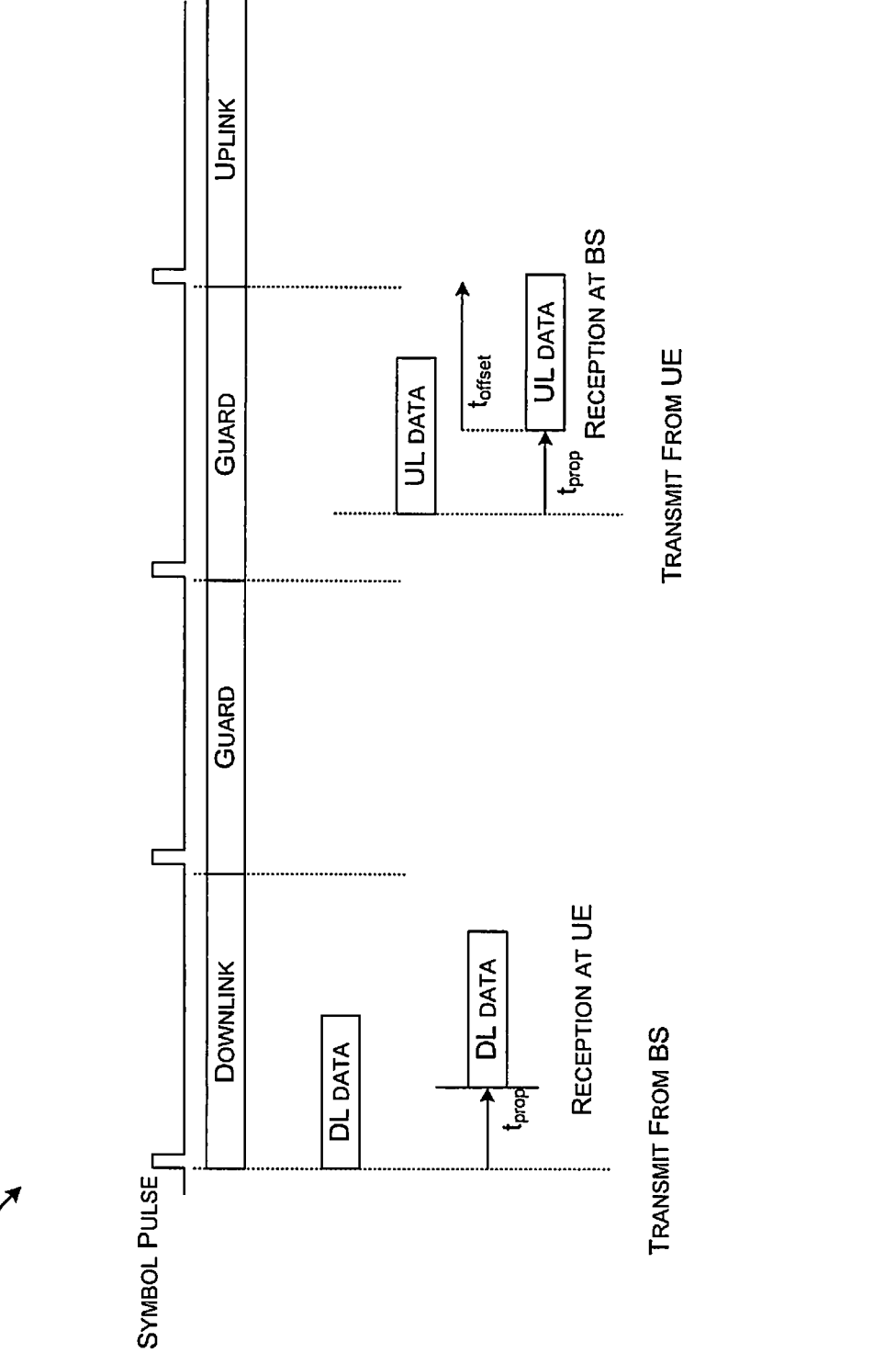
FIG. 6 illustrates an example representation of a base station transmit-receive pattern, in accordance with an embodiment of the present disclosure.

FIG. 6 illustrates an example representation 600 of a base station transmit-receive pattern, in accordance with embodiments of the present disclosure.

Referring to FIG. 6, uplink symbols may be received a little earlier than symbol boundary definition, as defined by $N_{TA,offset}$ values, as per the 3GPP technical specification TS 38.133. $N_{TA,offset}$ values is depicted as $t_{offset}$ in FIG. 6. Further, $t_{prop}$ may be on-air propagation delay of downlink and uplink data. It may be noted that the uplink data and the downlink data may be OFDM symbols. The uplink symbol received at an antenna may be delayed, aligning it with the symbol boundary, as shown in FIG. 6. It may be noted that the delay values required to align the uplink received symbol to a downlink transmitted symbol may be predefined based on experimental data and may be stored in a memory location for easy retrieval of parameters. In an example embodiment, the delay values may be kept fixed for the entire operation duration of the radio unit. Accordingly, in accordance with embodiments of the present disclosure, this helps a beamformer (e.g., 124) in performing beamforming for downlink, uplink, and PRACH symbol data simultaneously within a single symbol duration, using a single beamforming core.

Figure 7:
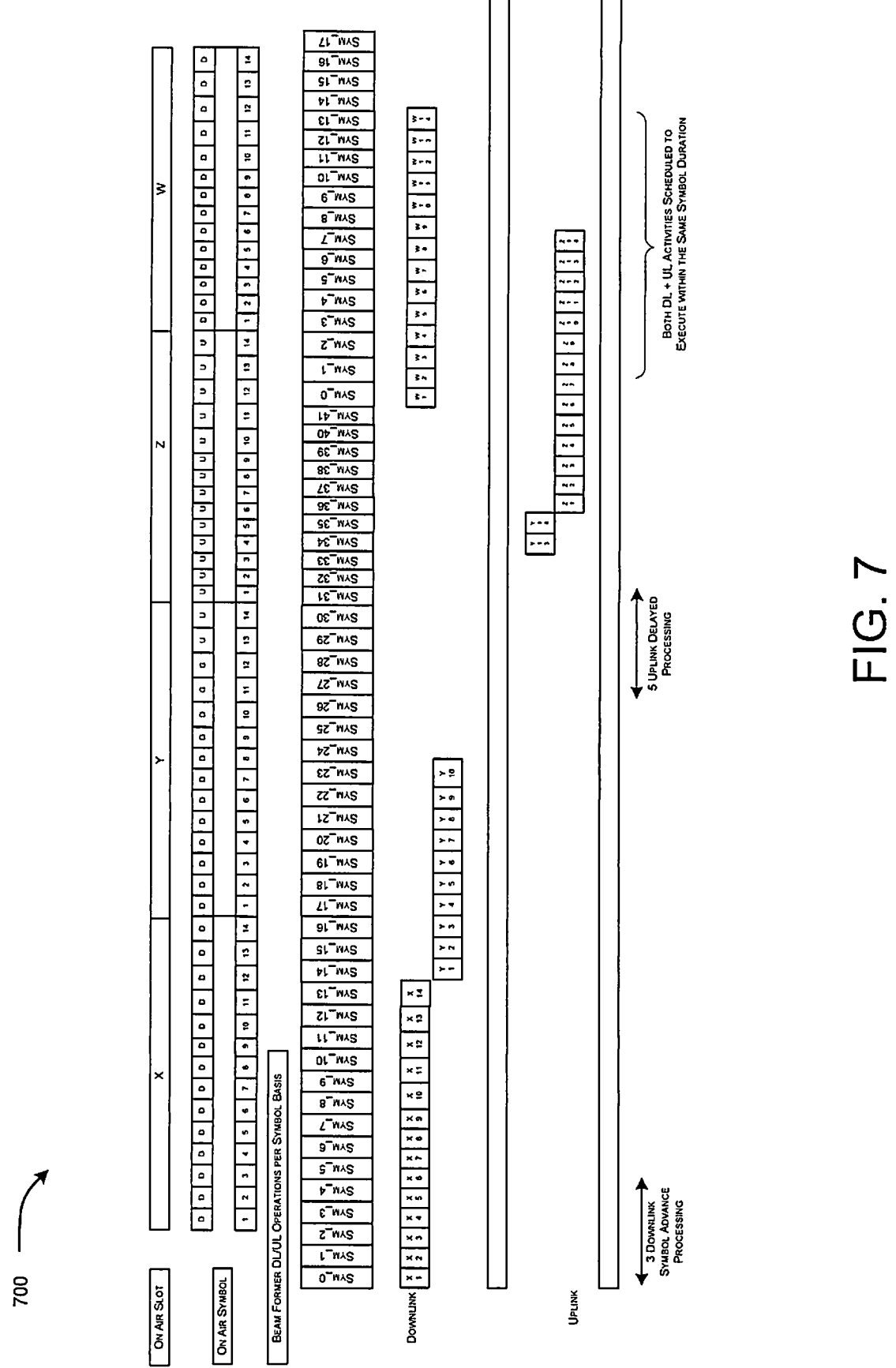
FIG. 7 illustrates an example representation depicting timing advance for downlink and deferment for uplink and physical random access channel (PRACH) operations, in accordance with an embodiment of the present disclosure.

FIG. 7 illustrates an example representation 700 depicting timing advance for downlink and deferment for uplink and PRACH operations, in accordance with embodiments of the present disclosure.

Referring to FIG. 7, as per 5G NR, X may refer to downlink slot, Y may refer to synchronization slot, and Z and W may refer to uplink slots. In an example embodiment, the synchronization slot may include 10 downlink symbols, 2 guard symbols, and 2 uplink symbols. A symbol counter, in FIG. 7, is considered from SYM_0 to SYM_41 to store information corresponding to slots in symbol action table and control information buffer in a scheduler.

As depicted in FIG. 7, a downlink symbol may be processed by a beamformer (e.g., 124) few symbols in advance than the time at which it may be radiated on air through an antenna. Similarly, an uplink symbol may be processed by the beamformer 124 after a certain delay, once it may be received on air at the antenna. This may be due to the processing delays added by subsequent blocks in the low physical (PHY) digital front end (DFE) chain. It may be noted that the delay encountered depends on the different blocks used in the DFE chain. The DFE blocks may be configured with settings defined by the radio frequency (RF) performance characteristics which the radio unit may be expected to exhibit. The delay from these blocks may have a fixed value and depend on the number of DFE blocks and their configurations being used.

For the proposed beamformer 124, the data paths of downlink and uplink may coincide at the beamformer 124. Due to the advancement of downlink symbol and deferment of uplink and PRACH symbol processing, it may be possible that downlink, uplink, and/or PRACH operations need to be performed by the beamformer 124 within a single OFDM symbol duration. Thus, within each symbol duration, a scheduler (e.g., 116) may generate downlink, uplink, and PRACH scheduling instructions, and the beamformer 124 may process downlink, uplink, and PRACH data if they may be scheduled to happen together. In some embodiments, PRACH may also be considered as an uplink operation. However, a separate PRACH instruction may be generated by the scheduler 116, when a PRACH symbol may be configured.

Referring to FIG. 7, all downlink symbols may be processed in advance by 3 symbols. All uplink symbols may be processed after 5 symbols once they are received on air. In some embodiments, symbol duration for downlink may be pre-determined based on configuration of DFE chain. For example, if DFE processing takes 1 symbol duration for low pass filtering, 1 symbol for IFFT operation, and 1 symbol for cyclic prefix addition, then the downlink symbols may be processed 3 symbol in advanced in order to compensate for the processing delay. Similarly, the symbol duration for uplink may be pre-determined to identify an exact uplink deferment value. Further, FIG. 7 shows the symbols where processing for both downlink and uplink (including PRACH) may be scheduled to be performed by the beamformer 124.

In accordance with embodiments of the present disclosure, the RF signal may be sampled using an oversampled clock with respect to a baseband clock frequency. This oversampled data may be forwarded through the RF chain after down-conversion to the baseband frequency followed by decimation. The beamformer 124 may be made to operate at this higher clock frequency, and operations for downlink and uplink (including PRACH) processing may be scheduled to be completed within one symbol duration. Further, this may be scaled to multiple carrier frequencies and within one symbol duration, uplink or PRACH processing for all carriers may be completed followed by downlink processing for all carriers.

The following calculations depict the feasibility of performing beamforming processing for downlink, uplink, and PRACH within a single symbol duration. In one of the embodiments, these calculations are done for subcarrier spacing (SCS) 30 kHz and for particular bandwidth and component carrier (CC) value as shown below:

OFDM symbol duration: 35.6 µs

SCS: 30 kHz

Carrier CC1 IBW: 100 MHZ

Max number of PRBs in one symbol: 273

This requires Inverse Fast Fourier Transform (IFFT)/FFT size to be 4096. The beamformer 124 runs at a clock frequency of 491.52 MHz performing a complex multiplication every clock cycle.

For PRACH, max number of REs in one symbol: 839

This requires IFFT/FFT size to be 1024.

Total time needed to process one downlink symbol $T_{dl}$: ≈8.33 µs

Total time needed to process one uplink symbol $T_{ul}$: ≈8.33 µs

Total time needed to process one PRACH symbol (for long format 0) $T_{prach}$: ≈2.08 µs Therefore, total time needed to process downlink/uplink/PRACH=$T_{dl}$+max ($T_{ul}$, $T_{prach}$)=8.33+8.33≈16.66 µs. Thus, if proper scheduling of operations is done at the beamformer 124 using multiplexing the data path, a single beamformer 124 may be used to process all the downlink, uplink, and PRACH information within one symbol duration. For example, a system with two carriers, i.e. CC1, CC2 having an instantaneous bandwidth (IBW) capacity of 100 MHz and 100 MHz, may be multiplexed in time to perform beamforming for downlink, uplink, and PRACH samples. Accordingly, total time needed to process downlink, uplink, or PRACH for CC1=$T_{cc1}$=16.66 µs, and total time needed to process downlink, uplink, or PRACH for CC2=$T_{cc2}$=16.66 µs. Therefore, total time needed to process downlink, uplink, or PRACH for 2 CC=$T_{cc1}$+$T_{cc2}$=16.33+16.33=32.66 µs. It may be noted that the beamformer configuration may be extended to multiple CC using higher overclocking of the beamforming core 124.

FIG. 8 illustrates a flow chart of an example method 800 for implementing time division multiplexing beamforming by a single beamformer, in accordance with embodiments of the present disclosure. It may be appreciated that the blocks of the method 800 may be performed by a beamformer (e.g., 124) of a radio unit (e.g., 104 or 100B), or one or more processors of the beamformer 124.

Referring to FIG. 8, at block 802, the method 800 may include receiving a C-plane packet from a fronthaul interface and storing corresponding control information of the C-plane packet at a scheduler (e.g., 116) of the radio unit 100B. At block 804, the method 800 may include storing beam weight information received in the control information in one or more beam weight buffers of the radio unit 100B, for example, a global beam weight buffer 120 or a cache buffer 122. In an example embodiment, the method 800 may include storing the beam weight information received in the control information in the global beam weight buffer 120 corresponding to a target symbol ID, and determining whether the beam weight information corresponding to a PRB action table (e.g., 202-3) may be available in the cache buffer 122 based on the next symbol being equal to the target symbol ID. In response to a negative determination, the method 800 may include pre-fetching the beam weight information for the next symbol from the global beam weight buffer 120 and storing the pre-fetched beam weight information in the cache buffer 122 based on the PRB action table 202-3. In response to a positive determination, the method 800 may include triggering the one or more scheduling instructions.

Further, at block 806, the method 800 may include receiving and storing data samples in data input buffers (e.g., 118-1, 118-2, 118-3) of the radio unit 100B. In an example embodiment, the data sample may include at least one of: an uplink data sample, a downlink data sample, and a PRACH data sample. At block 808, the method 800 may include receiving processing information from a timer or a timing unit (e.g., 114) of the radio unit 100B. In an example embodiment, the processing information may include, but not be limited to, a current frame, a subframe, and a symbol ID being processed by an antenna on air.

At block 810, the method 800 may include receiving one or more scheduling instructions for at least two of the data input buffers (118-1, 118-2, 118-3) from the scheduler 116. In an example embodiment, the one or more scheduling instructions may be based at least on the processing information and the timing information received in the control information. In an example embodiment, the method 800 may include associating the control information with a unique identifier in a control information buffer (e.g., 202-1) of the scheduler 116, storing the unique identifier in a symbol action table (e.g., 202-2) of the scheduler 116 based on the delay value for the one or more scheduling instructions, updating the PRB action table 202-3 of the scheduler 116 based on the symbol action table 202-2 for a next symbol to be processed, and triggering the one or more scheduling instructions for the data samples based on the symbol action table 202-2 and the processing information for the next symbol within the single symbol duration. In an example embodiment, each entry in the PRB action table 202-3 may include information corresponding to masking of a resource element to enable beamforming of two channels independently within the resource element, wherein the two channels may include a data channel and a control channel, or two independent data channels.

Further, at block 812, the method 800 may include sequentially retrieving the data samples from the at least two of the data input buffers (118-1, 118-2, 118-3) based on the one or more scheduling instructions. In an example embodiment, the method 800 may include sequentially retrieving by retrieving the uplink data sample from an uplink data input buffer (e.g., 118-2) based on determining an uplink operation command, retrieving the PRACH data sample from a PRACH data input buffer (e.g., 118-3) based on determining a PRACH operation command, and retrieving the downlink data sample from a downlink data input buffer (e.g., 118-1) based on determining a downlink operation command.

Referring to FIG. 8, at block 814, the method 800 may include processing the retrieved data samples from the at least two of the data input buffers (118-1, 118-2, 118-3) for beamforming within a single symbol duration based on synchronization of the one or more scheduling instructions. In an example embodiment, the beamformer 124 may perform beamforming for the retrieved data samples independently. In another example embodiment, the beamformer 124 may simultaneously perform beamforming for the retrieved data samples within the single symbol duration. In an example embodiment, the method may include processing the retrieved data samples by calculating a delay value for the one or more scheduling instructions in processing each of the retrieved data samples. The delay value may include at least one of an advanced delay value for a downlink operation command corresponding to the downlink data sample, a deferred delay value for an uplink operation command corresponding to the uplink data sample, and a deferred delay value for a PRACH operation command for the PRACH data sample. In an example embodiment, the delay values for the one or more scheduling instructions may be stored at the scheduler 116. The delay values may be based on a hardware configuration of respective downlink DFE RF chain, uplink DFE RF chain, and PRACH DFE RF chain. In an example embodiment, the delay values may be with respect to a number of OFDM symbols buffering capacity required in the DFE modules. In an example embodiment, the processing of the retrieved data samples may include processing the uplink data sample after a deferred delay value associated with the uplink operation command once the uplink data sample is received at an antenna, processing the PRACH data sample after a deferred delay value associated with the PRACH operation command once the PRACH data sample is received at the antenna, and processing the downlink data sample at an advanced delay value associated with the downlink operation command than the time at which the downlink data sample is to radiate through the antenna.

In some embodiments, the method 800 may include determining whether the one or more scheduling instructions include an uplink operation command, a downlink operation command, or a PRACH operation command, retrieving the beam weight information from the one or more beam weight buffers based on the determination, processing the retrieved data samples from the at least two of the data input buffers and the beam weight information to generate beamformed data samples based on the one or more scheduling instructions within the single symbol duration, and storing the beamformed data samples in corresponding data output buffers (e.g., 126-1, 126-2, 126-3) of the radio unit 100B.

It may be appreciated that the steps shown in FIG. 8 are merely illustrative. Other suitable steps may be used for the same, if desired. Moreover, the steps of the method 800 may be performed in any order and may include additional steps.

Figure 9A:
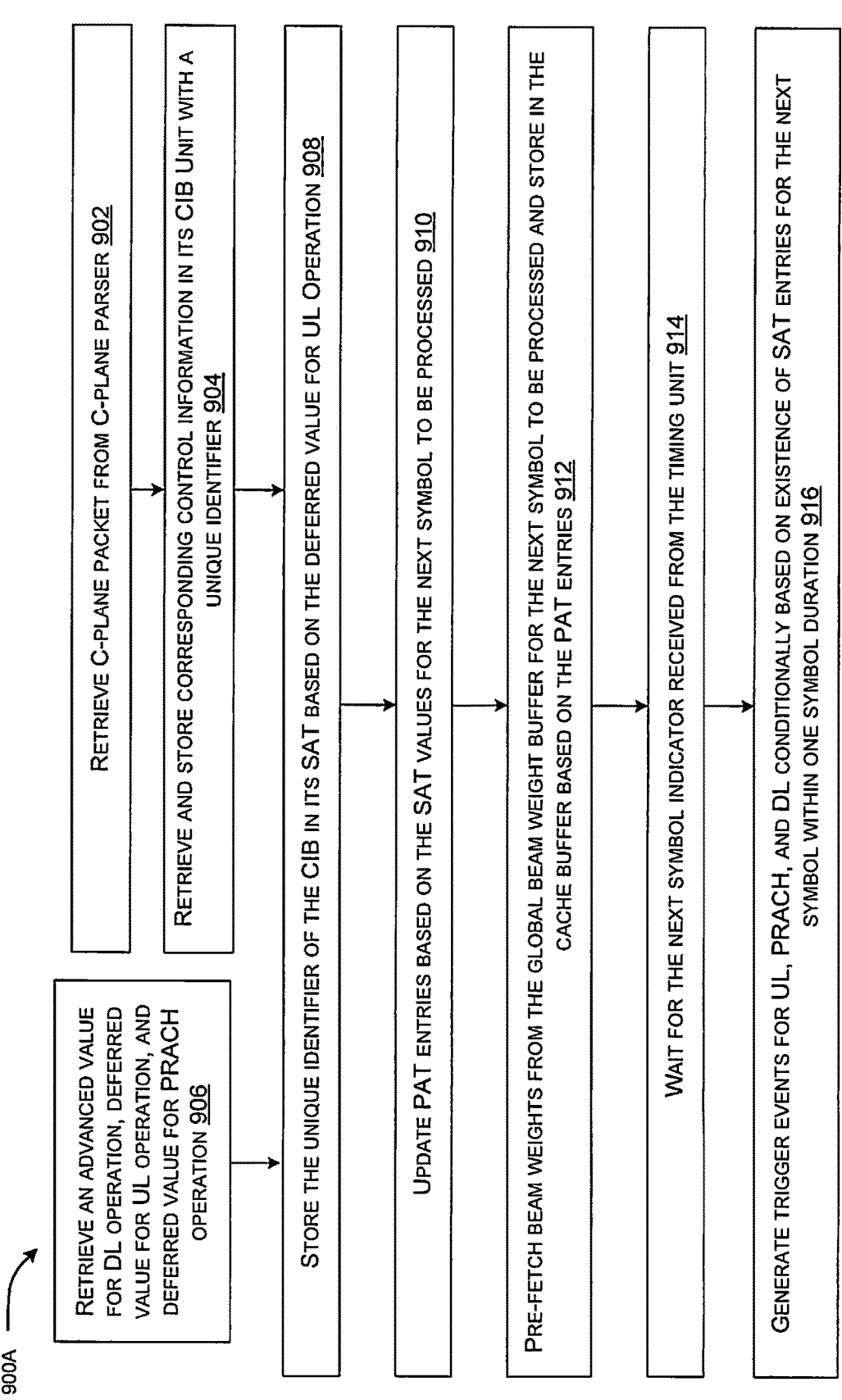

FIGS. 9A and 9B illustrate flow charts of example methods (900A, 900B) for implementing triggering of one or more scheduling instructions by a scheduler of a radio unit, in accordance with embodiments of the present disclosure. It may be appreciated that the blocks of the method 900 may be implemented by the scheduler (e.g., 116 or 200) of the radio unit (e.g., 104 or 100B).

Referring to FIG. 9A, at block 902, the method 900A may include receiving a C-plane packet from a C-plane parser (e.g., 112) of the radio unit 100B. At block 904, the method 900A may include retrieving and storing corresponding control information in a control information buffer (e.g., 202-1) with a unique ID. In an example embodiment, the control information may include, but not limited to, timing offset value, and frequency offset values. Further, at block 906, the method 900A may include retrieving delay values associated with one or more scheduling instructions. In an example embodiment, the method 900A may include retrieving an advanced value associated with a downlink operation command, a deferred value for an uplink operation command, and a deferred value for a PRACH operation command.

Further, at block 908, the method 900A may include storing the unique ID of the control information buffer 202-1 in a symbol action table (e.g., 202-2) for target symbols based on the deferred value of the downlink operation command. At block 910, the method 900A may include updating entries of a PRB action table (e.g., 202-3) based on values of the symbol action table 202-2 for a next symbol to be processed. Further, at block 912, the method 900A may include pre-fetching beam weigh information from a global beam weight buffer (e.g., 120) for the next symbol, and storing the beam weight information in a cache buffer (e.g., 122) based on the entries of the PRB action table 202-3.

Referring to FIG. 9A, at block 914, the method 900A may include waiting for a next symbol indicator to be received from a timer or timing unit (e.g., 114). For example, the method 900A may include receiving processing information from the timer 114. Further, at block 916, the method 900A may include conditionally generating trigger events for data samples for at least two data input buffers (e.g., 118-1, 118-2, 118-3) based on the symbol action table values 202-2 and the processing information for the next symbol within a single symbol duration.

Referring to FIG. 9B, the same steps as mentioned above with reference to FIG. 9A may be performed from step 902 to 916. An additional step 918 may be performed, which may include calculating target symbols and PRBs for PRACH reception and processing based on numerology and deferment value for all PRACH occasions and repetitions. In an example embodiment, the method 900B may include calculating a start symbol of PRACH occasion using timing offset value, and calculating startPRB and NumPRB using frequency offset values.

In accordance with embodiments of the present disclosure, having a single beamformer for processing fixed numerology PUxCH (may include PUCCH or PUSCH) and multiple numerologies, PRACH requires additional consideration due to inverse relation of PRACH numerology with symbol duration. The beamformer may be active for all symbols for which PRACH occasions and repetitions occur. Additionally, the beamformer may pre-calculate the number of samples to process during the current symbol duration and act accordingly. All PRACH numerologies which may be less than or equal to the PUxCH, fixed numerology may be supported. For example, PUxCH SCS may be 30 KHz and corresponding supported PRACH SCS may be 30, 15, 5, 1.25 KHz. In case of PRACH SCS of 15 KHz, the PRACH symbol duration may nearly double that of PRACH SCS 30 KHz.

It may be appreciated that the steps shown in FIGS. 9A and 9B are merely illustrative. Other suitable steps may be used for the same, if desired. Moreover, the steps of the methods (900A, 900B) may be performed in any order and may include additional steps.

Figures 10A, 10B:
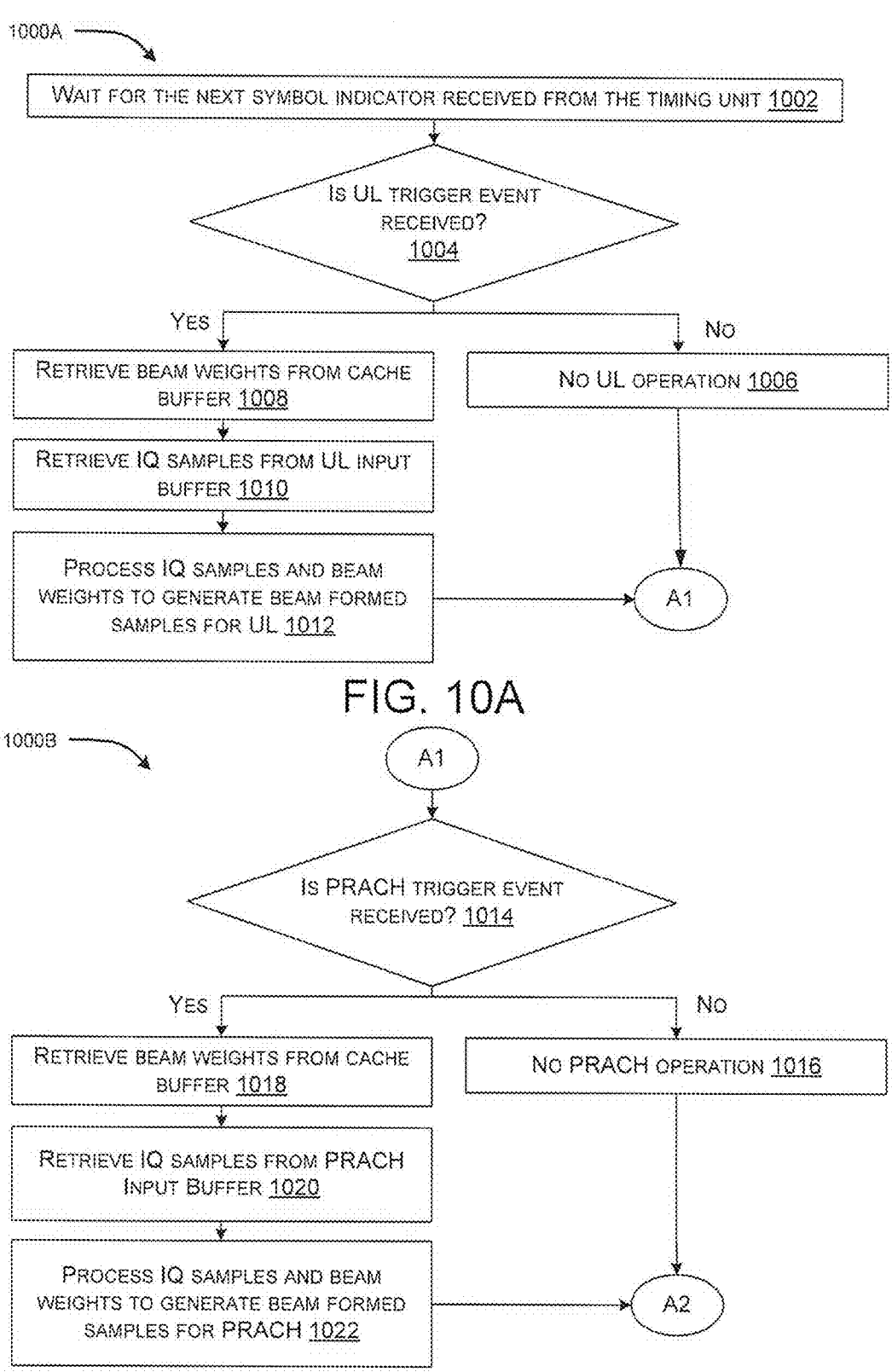

FIGS. 10A-10C illustrate flow charts of example methods (1000A, 1000B, 1000C) for implementing synchronization of scheduling instructions, in accordance with embodiments of the present disclosure. It may be appreciated that the blocks may be performed by a beamformer (e.g., 124) of a radio unit (e.g., 104 or 100B).

Referring to FIG. 10A, at block 1002, the method 1000A may include waiting for a next symbol indicator to be received from a timer or a timing unit (e.g., 114) of the radio unit 100B. At block 1004, the method 1000A may include determining whether an uplink operation command is received from a scheduler (e.g., 116) of the radio unit 100B. If an uplink operation command is not received, at block 1006, the method 1000A may include determining that there is no uplink operation command. If an uplink operation command is received, at block 1008, the method 1000A may include retrieving beam weight information from a cache buffer (e.g., 122) of the radio unit 100B. Further, at block 1010, the method 1000A may include retrieving IQ samples from an uplink data input buffer (e.g., 118-2) of the radio unit 100B. Furthermore, at block 1012, the method 1000A may include processing the IQ samples and the beam weights to generate beamformed samples for uplink. In an example embodiment, the method 1000A may include storing the uplink beamformed samples in an uplink data output buffer (e.g., 126-2) of the radio unit 100B.

Referring to FIG. 10B, at block 1014, the method 1000B may include determining whether a PRACH operation is received from the scheduler 116 in case there is no uplink operation command. If a PRACH operation command is not received, at block 1016, the method 1000B may include determining that there is no PRACH operation command. If a PRACH operation command is received, at block 1018, the method 1000B may include retrieving beam weight information from the cache buffer 122. Further, at block 1020, the method 1000B may include retrieving IQ samples from a PRACH data input buffer (e.g., 118-3) of the radio unit 100B. Furthermore, at block 1022, the method 1000B may include processing the IQ samples and the beam weights to generate beamformed samples for PRACH. In an example embodiment, the PRACH beamformed samples may be stored at a PRACH data output buffer (e.g., 126-3) of the radio unit 100B.

Referring to FIG. 10C, at block 1024, the method 1000C may include determining whether a downlink operation is received from the scheduler 116 in case there is no uplink and PRACH command. If a downlink operation command is not received, at block 1026, the method 1000C may include determining that there is no downlink operation command. If a downlink operation command is received, at block 1028, the method 1000C may include retrieving beam weight information from the cache buffer 122. Further, at block 1030, the method 1000C may include retrieving IQ samples from a downlink data input buffer (e.g., 118-1) of the radio unit 100B. Furthermore, at block 1032, the method 1000C may include processing the IQ samples and the beam weights to generate beamformed samples for downlink. In an example embodiment, the downlink beamformed samples may be stored at a downlink data output buffer (e.g., 126-1) of the radio unit 100B. At block 1034, the method 1000C may include waiting for a next symbol indicator from the timer 114.

It may be appreciated that the steps shown in FIGS. 10A-10C are merely illustrative. Other suitable steps may be used for the same, if desired. Moreover, the steps of the methods 1000A-1000C may be performed in any order and may include additional steps.

FIG. 11 illustrates a flow chart of an example method 1100 for implementing optimal beam weight retrieval, in accordance with embodiments of the present disclosure.

Efficient use of beam weights may be an important measure to reduce the frequent retrieval of beam weights from a distributed unit (e.g., 106), and hence, reduce overall energy requirements. Having a global beam weight buffer (e.g., 120) in the beamformer architecture reduces the burden at the distributed unit 106 to send the same beam weights repeatedly for the same bandwidth part across symbols. Thus, common beam weights which may be applied across symbol boundaries may be stored in the global beam weight buffer 120 and reused. Any new beam weights or update in beam weight entries may need to be communicated by the distributed unit 106. Further, having a caching mechanism may free the slower global beam weight memory from repeatedly accessing the same beam weight. This functionality gets offloaded to a cache buffer (e.g., 122) which may have lower latency requirements.

Referring to FIG. 11, at block 1102, the method 1100 may include storing beam weight information received from a C-plane parser (e.g., 112) corresponding to a target symbol ID in a global beam weight buffer (e.g., 120). At block 1104, the method 1100 may include performing pre-processing, by the scheduler 116, when next symbol is equal to the target symbol ID. In particular, at block 1106, the method 1100 may include determining if beam weights corresponding to entries of a PRB action table (e.g., 202-3) are available in the cache buffer 122. If the beam weights are available in the cache buffer 122, at block 1108, the scheduler 116 may not perform pre-fetching operation. If the beam weights are unavailable in the cache buffer 122, at block 1110, the method 1100 may include pre-fetching the beam weights from the global beam weight buffer 120 for the next symbol to be processed, and storing the beam weights in the cache buffer 122 based on the entries in the PRB action table 202-3.

As depicted in FIGS. 4, 5 and 6, there may be multiple data channels getting data in parallel for further beamforming operation. In order to perform the beamforming of data received from multiple data channels, within a single symbol duration, the cache buffer (e.g., 122) may have multiple sub-segments or sub-modules providing beam weight information corresponding to each of the data channels input. Further, each cache buffer sub-segment or sub-module may pre-fetch beam weight related information from the global beam weight buffer 120, which may be performed using a round robin arbitration scheme with fair sharing. The processor associated with a radio unit may generate one request per stream based on the negative response of the beam weight information corresponding to the PRB action table being available in cache buffer 122. This request may be serviced by an arbitrator associated with the global beam weight buffer 120 and the beam weight information may be pre-fetched and stored in the cache buffer 122. A fair sharing approach may be used such that as the number of requests scale, a list of active requestors may get updated, and arbitration slots may be generated dynamically for each active requestor. This ensures that any new request is not stalled for a long period of time, while processing any current/previous request. When the beam weight fetch cycle is complete, the requestor may be removed from the list of active requestors.

In some example embodiments, the beamformer 124 with 8 streams of beam weights and 8 streams of data channels may be implemented in a field programmable gate array (FPGA). This, therefore, may constitute 8 slices with each slice architecture being as shown in FIG. 4. The beamformer 124 may provide output to 8 antenna ports. Table 1 depicts the example resources which may be utilized by the 8×8 beamformer circuit final implementation in FPGA.

TABLE 1

| Logic Elements | Single Beamformer supporting DL/UL/2CC | Separate Beamformer for DL/UL/2CC |
|---|---|---|
| Look-up Tables | 178878 | 193992 |
| Register | 257521 | 333598 |
| Small RAM (4 KByte) | 473 | 623 |
| Large RAM (32 KByte) | 143 | 143 |
| DSP slice | 249 | 996 |

Therefore, in accordance with embodiments of the present disclosure, implementing a single beamformer on 8×8 matrix multiplication may occupy 249 digital signal processor (DSP) slices, as an example. If a separate beamformer is implemented for each of downlink/uplink operations and further for 2 CC scenario, this resource utilization for the DSP slices may shoot up, and add routing and timing complexity. By implementing a single beamformer unit and time sharing the beamformer unit for downlink, uplink, and/or PRACH operations, resources occupied within the unit may be reduced, thereby improving area and power specifications of the design. Furthermore, by using significantly lower DSP slices, the on-chip power requirement is reduced. For example, table 2 depicts example parameters by implementing the proposed beamformer 124 with configurations given in table 1.

TABLE 2

| Parameters | Proposed Architecture (Single Beamformer supporting 2CC) | Conventional Architecture (Separate Beamformer for DL/UL/2CC) |
|---|---|---|
| Total On-Chip Power | 15.2 W | 18.2 W |
| Junction Temperature | 56.9 degree C. | 63.1 degree C. |
| Thermal Margin | 43.1 degree C./19.2 W | 36.9 degree C./16.3 W |

Therefore, as depicted in table 2, the architecture implemented using a single beamformer shows better results in terms of on-chip power requirement, junction temperature, thermal margin, and the like. This may be the result of lower utilization of DSP slices in the architecture.

The blocks of the flow diagrams shown in FIGS. 8-11 have been arranged in a generally sequential manner for ease of explanation; however, it is to be understood that this arrangement is merely exemplary, and it should be recognized that the processing associated with methods (800, 900A, 900B, 1000A, 1000B, 1000C, 1100) may occur in a different order (for example, where at least some of the processing associated with the blocks is performed in parallel and/or in an event-driven manner). Further, it may be appreciated that the steps shown in FIGS. 8-11 are merely illustrative. Other suitable steps may be used for the same, if desired. Moreover, the steps of the method (800, 900A, 900B, 1000A, 1000B, 1000C, 1100) may be performed in any order and may include additional steps.

The methods and techniques described here may be implemented in digital electronic circuitry, field programmable gate array (FPGA), or with a programmable processor (for example, a special-purpose processor or a general-purpose processor such as a computer) firmware, software, or in combinations of them. Apparatus embodying these techniques may include appropriate input and output devices, FPGA, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system, explained in detail with reference to FIG. 12, including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), and flash memory devices;

magnetic disks such as internal hard disks and removable disks; and magneto-optical disks. Any of the foregoing may be supplemented by, or incorporated in, specially designed application-specific integrated circuits (ASICs).

Figure 12:
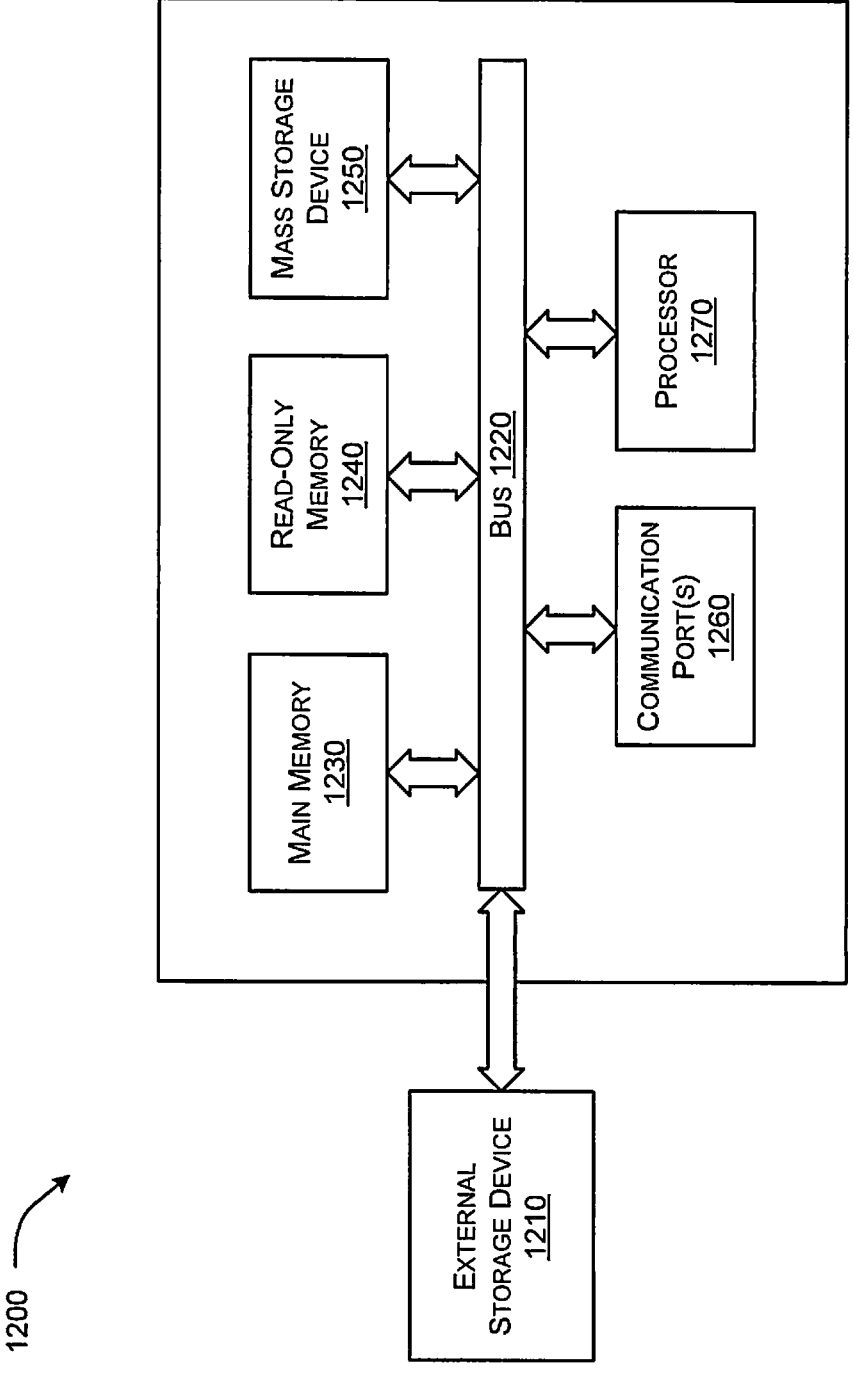
FIG. 12 illustrates an exemplary computer system in which or with which the proposed mechanism may be implemented, in accordance with an embodiment of the present disclosure.

In particular, FIG. 12 illustrates an exemplary computer system 1200 in which or with which embodiments of the present disclosure may be utilized. The computer system 1200 may be implemented as or within the radio unit 104 and/or any suitable network device described in accordance with embodiments of the present disclosure.

As depicted in FIG. 12, the computer system 1200 may include an external storage device 1210, a bus 1220, a main memory 1230, a read-only memory 1240, a mass storage device 1250, communication port(s) 1260, and a processor 1270. A person skilled in the art will appreciate that the computer system 1200 may include more than one processor 1270 and communication ports 1260. The processor 1270 may include various modules associated with embodiments of the present disclosure. The communication port(s) 1260 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1260 may be chosen depending on a network, such a Local Area Network (LAN), Wide Area Network (WAN), or any network to which the computer system 1200 connects.

In an embodiment, the main memory 1230 may be Random Access Memory (RAM), or any other dynamic storage device commonly known in the art. The read-only memory 1240 may be any static storage device(s) e.g., but not limited to, a Programmable Read Only Memory (PROM) chips for storing static information e.g., start-up or basic input output system (BIOS) instructions for the processor 1270. The mass storage device 1250 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus 1220 communicatively couples the processor 1270 with the other memory, storage, and communication blocks. The bus 1220 may be, e.g., a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 1270 to the computer system 1200.

In another embodiment, operator and administrative interfaces, e.g., a display, keyboard, and a cursor control device, may also be coupled to the bus 1220 to support direct operator interaction with the computer system 1200. Other operator and administrative interfaces may be provided through network connections connected through the communication port(s) 1260. Components described above are meant only to exemplify various possibilities. In no way should the aforementioned exemplary computer system 1200 limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the inter-action of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides an efficient solution for a single beamformer leading to power consumption, less on-chip area requirement, and compact design.

The present disclosure optimizes power consumption without any performance degradation.

The present disclosure provides efficient time multiplexed digital beamforming.

We claim:

1. A radio unit for efficient beamforming, comprising:
    a control-plane (C-plane) parser to receive a C-plane packet from a fronthaul interface, wherein the C-plane packet comprises control information corresponding to beam weight information and timing information;
    one or more beam weight buffers to store the beam weight information;
    data input buffers to receive and store data samples, wherein the data samples comprise at least one of: an uplink data sample, a downlink data sample, and a physical random access channel (PRACH) data sample;
    a timer to generate and provide processing information to a scheduler;
    the scheduler to generate one or more scheduling instructions for at least two of the data input buffers, wherein the one or more scheduling instructions are based on the processing information and the timing information; and
    a beamformer to:
    sequentially retrieve the data samples from the at least two of the data input buffers based on the one or more scheduling instructions; and
    process the retrieved data samples from the at least two of the data input buffers for beamforming within a single symbol duration based on synchronization of the one or more scheduling instructions.

2. The radio unit as claimed in claim 1, wherein the beamformer is to process the retrieved data samples by being configured to:
    calculate a delay value for each of the one or more scheduling instructions in processing each of the retrieved data samples, wherein the delay value comprises at least one of: an advanced value for a downlink operation command corresponding to the downlink data sample, a deferred value for an uplink operation command corresponding to the uplink data sample, and a deferred value for a PRACH operation command for the PRACH data sample; and
    store, by the processor, the delay value for each of the one or more scheduling instructions at the scheduler, wherein the delay value is based on a hardware configuration of respective downlink digital front end (DFE) radio frequency (RF) chain, uplink DFE RF chain, and a PRACH DFE RF chain.

3. The radio unit as claimed in claim 1, wherein the beamformer is to process the retrieved data samples by performing the beamforming for the retrieved data samples independently.

4. The radio unit as claimed in claim 1, wherein the beamformer is to process the retrieved data samples by performing the beamforming for the retrieved data samples simultaneously.

5. The radio unit as claimed in claim 1, wherein the beamformer is to process the retrieved data samples by:
    determining whether the one or more scheduling instructions comprise an uplink operation command, a downlink operation command, or a PRACH operation command;
    retrieving the beam weight information from the one or more beam weight buffers based on the determination;
    processing the retrieved data samples from the at least two of the data input buffers and the beam weight information to generate beamformed data samples based on the one or more scheduling instructions within the single symbol duration; and
    storing the beamformed data samples in corresponding data output buffers of the radio unit.

6. The radio unit as claimed in claim 5, wherein the data input buffers comprise: an uplink data input buffer, a downlink data input buffer, and a PRACH data input buffer corresponding to each of the uplink data sample, the downlink data sample, and the PRACH data sample, and wherein the data output buffers comprise: an uplink data output buffer, a downlink data output buffer, and a PRACH data output buffer corresponding to each of a beamformed uplink data sample, a beamformed downlink data sample, and a beamformed PRACH data sample, and
    wherein the beamformer is to sequentially retrieve the data samples from the at least two of the data input buffers by:
    retrieving the uplink data sample from the uplink data input buffer based on determining the uplink operation command:
    retrieving the PRACH data sample from the PRACH data input buffer based on determining the PRACH operation command; and
    retrieving the downlink data sample from the downlink data input buffer based on determining the downlink operation command.

7. The radio unit as claimed in claim 5, wherein the beamformer is to process the retrieved data samples by:
    processing the uplink data sample after a deferred value associated with the uplink operation command once the uplink data sample is received at an antenna;
    processing the PRACH data sample after a deferred value associated with the PRACH operation command once the PRACH data sample is received at the antenna; and
    processing the downlink data sample at an advanced value associated with the downlink operation command than the time at which the downlink data sample is to radiate through the antenna.

8. The radio unit as claimed in claim 2, wherein the scheduler is to:

store the corresponding control information;

associate the control information with a unique identifier in a control information buffer;

store the unique identifier in a symbol action table based on the delay value for each of the one or more scheduling instructions;

update a physical resource block (PRB) action table based on the symbol action table for a next symbol to be processed; and trigger the one or more scheduling instructions for the data samples based on the symbol action table and the processing information for the next symbol within the single symbol duration.

9. The radio unit as claimed in claim 8, wherein each entry in the PRB action table comprises information corresponding to masking of a resource element to enable beamforming of two channels independently within the resource element, and wherein the two channels comprise one of: a data channel and a control channel, or two independent data channels.

10. The radio unit as claimed in claim 8, wherein the beamformer is to store the beam weight information received in the control information in a global beam weight buffer of the one or more beam weight buffers corresponding to a target symbol identifier (ID), and wherein the scheduler is to:

determine whether the beam weight information corresponding to the PRB action table is available in a cache buffer of the one or more beam weight buffers based on the next symbol being equal to the target symbol ID;

in response to a negative determination, pre-fetch the beam weight information for the next symbol from the global beam weight buffer and store the pre-fetched beam weight information in the cache buffer based on the PRB action table; and in response to a positive determination, trigger the one or more scheduling instructions.

11. The radio unit as claimed in claim 1, wherein the beamformer comprises:

a plurality of slices, each slice comprising complex multipliers and complex adders, wherein each slice generates an output for an antenna in case of a downlink operation command, and wherein each slice is followed by a subsequent complex adder to generate output for one stream in case of an uplink operation command.

12. A method for efficient beamforming, comprising:

receiving, by a processor associated with a radio unit, a control-plane (C-plane) packet from a fronthaul interface and storing corresponding control information of the C-plane packet at a scheduler of the radio unit;

storing, by the processor, beam weight information received in the control information in one or more beam weight buffers of the radio unit;

receiving and storing, by the processor, data samples in data input buffers of the radio unit, wherein the data samples comprise at least one of: an uplink data sample, a downlink data sample, and a physical random access channel (PRACH) data sample;

receiving, by the processor, processing information from a timer of the radio unit;

receiving, by the processor, one or more scheduling instructions for at least two of the data input buffers from the scheduler, wherein the one or more scheduling instructions are based on the processing information and timing information received in the control information;

sequentially retrieving, by the processor, the data samples from the at least two of the data input buffers based on the one or more scheduling instructions; and processing, by the processor, the retrieved data samples from the at least two of the data input buffers for beamforming within a single symbol duration based on synchronization of the one or more scheduling instructions.

13. The method as claimed in claim 12, wherein processing, by the processor, the retrieved data samples comprises:

calculating, by the processor, a delay value for each of the one or more scheduling instructions in processing each of the retrieved data samples, wherein the delay value comprises at least one of: an advanced value for a downlink operation command corresponding to the downlink data sample, a deferred value for an uplink operation command corresponding to the uplink data sample, and a deferred value for a PRACH operation command for the PRACH data sample; and storing, by the processor, the delay value for each of the one or more scheduling instructions at the scheduler;

wherein the delay value is based on a hardware configuration of respective downlink digital front end (DFE) radio frequency (RF) chain, uplink DFE RF chain, and a PRACH DFE RF chain.

14. The method as claimed in claim 12, wherein processing, by the processor, the retrieved data samples comprises:

determining, by the processor, whether the one or more scheduling instructions comprise an uplink operation command, a downlink operation command, or a PRACH operation command;

retrieving, by the processor, the beam weight information from the one or more beam weight buffers based on the determination;

processing, by the processor, the retrieved data samples from the at least two of the data input buffers and the beam weight information to generate beamformed data samples based on the one or more scheduling instructions within the single symbol duration; and storing, by the processor, the beamformed data samples in corresponding data output buffers of the radio unit.

15. The method as claimed in claim 14, wherein the data input buffers comprise: an uplink data input buffer, a downlink data input buffer, and a PRACH data input buffer corresponding to each of the uplink data sample, the downlink data sample, and the PRACH data sample, and wherein the data output buffers comprise: an uplink data output buffer, a downlink data output buffer, and a PRACH data output buffer corresponding to each of a beamformed uplink data sample, a beamformed downlink data sample, and a beamformed PRACH data sample; and wherein sequentially retrieving, by the processor, the data samples from the at least two of the data input buffers comprises:

retrieving, by the processor, the uplink data sample from the uplink data input buffer based on determining the uplink operation command;

retrieving, by the processor, the PRACH data sample from the PRACH data input buffer based on determining the PRACH operation command; and retrieving, by the processor, the downlink data sample from the downlink data input buffer based on determining the downlink operation command.

16. The method as claimed in claim 14, wherein processing, by the processor, the retrieved data samples comprises:

processing, by the processor, the uplink data sample after a deferred value associated with the uplink operation command once the uplink data sample is received at an antenna;

processing, by the processor, the PRACH data sample after a deferred value associated with the PRACH operation command once the PRACH data sample is received at the antenna; and processing, by the processor, the downlink data sample at an advanced value associated with the downlink operation command than the time at which the downlink data sample is to radiate through the antenna.

17. The method as claimed in claim 13, wherein receiving, by the processor, the one or more scheduling instructions from the scheduler comprises:

associating, by the processor, the control information with a unique identifier in a control information buffer of the scheduler;

storing, by the processor, the unique identifier in a symbol action table of the scheduler based on the delay value for each of the one or more scheduling instructions;

updating, by the processor, a physical resource block (PRB) action table of the scheduler based on the symbol action table for a next symbol to be processed; and triggering, by the processor, the one or more scheduling instructions for the data samples based on the symbol action table and the processing information for the next symbol within the single symbol duration.

18. The method as claimed in claim 17, wherein storing, by the processor, the beam weight information in the one or more beam weight buffers comprises:

storing, by the processor, the beam weight information received in the control information in a global beam weight buffer of the one or more beam weight buffers corresponding to a target symbol identifier (ID);

determining, by the processor, whether the beam weight information corresponding to the PRB action table is available in a cache buffer of the one or more beam weight buffers based on the next symbol being equal to the target symbol ID;

in response to a negative determination, pre-fetching, by the processor, the beam weight information for the next symbol from the global beam weight buffer and storing the pre-fetched beam weight information in the cache buffer based on the PRB action table; and in response to a positive determination, triggering the one or more scheduling instructions.

19. A method for efficient beamforming, comprising:

receiving, by a processor associated with a radio unit, a control-plane (C-plane) packet from a fronthaul interface;

extracting and storing, by the processor, control information from the C-plane packet in a control information buffer of a scheduler with a unique identifier;

retrieving, by the processor, a delay value associated with one or more scheduling instructions;

storing, by the processor, the unique identifier of the control information buffer in a symbol action table for target symbols based on the delay value;

updating, by the processor, physical resource block (PRB) action table entries based on the symbol action table for a next symbol to be processed;

pre-fetching, by the processor, beam weight information from a global beam weight buffer for the next symbol and storing the pre-fetched beam weight information in a cache buffer based on the PRB action table entries;

receiving, by the processor, processing information from a timer of the radio unit;

triggering, by the processor, the one or more scheduling instructions for data samples from at least two data input buffers based on the symbol action table and the processing information for the next symbol within a single symbol duration, wherein the data samples comprise at least one of: an uplink data sample, a downlink sample, and a physical random access channel (PRACH) data sample.

20. The method as claimed in claim 19, comprising:

calculating, by the processor, one or more parameters for the PRACH data sample based at least on numerology, the delay value, and the control information, wherein the one or more parameters comprise at least one of: target symbols, start symbols, start of PRB, and number of PRBs for PRACH reception and processing.

* * * * *